United States Patent
Iizuka

(10) Patent No.: US 11,968,335 B2
(45) Date of Patent: Apr. 23, 2024

(54) APPARATUS HAVING HUMAN DETECTION FUNCTION

(71) Applicant: FUJIFILM Business Innovation Corp., Tokyo (JP)

(72) Inventor: Takahiro Iizuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 352 days.

(21) Appl. No.: 17/543,669

(22) Filed: Dec. 6, 2021

(65) Prior Publication Data
US 2023/0056361 A1 Feb. 23, 2023

(30) Foreign Application Priority Data
Aug. 23, 2021 (JP) ................. 2021-135285

(51) Int. Cl.
*H04N 1/04* (2006.01)
*H04N 1/00* (2006.01)

(52) U.S. Cl.
CPC ..... *H04N 1/00323* (2013.01); *H04N 1/00557* (2013.01); *H04N 1/00631* (2013.01)

(58) Field of Classification Search
None
See application file for complete search history.

(56) References Cited

U.S. PATENT DOCUMENTS

| 8,917,402 | B2* | 12/2014 | Baba | H04N 1/00323 |
| | | | | 358/1.13 |
| 10,911,627 | B2 | 2/2021 | Saeda et al. | |
| 2012/0204046 | A1* | 8/2012 | Baba | G06F 1/3231 |
| | | | | 713/323 |
| 2012/0326038 | A1* | 12/2012 | Yamashina | G03G 15/5004 |
| | | | | 250/206 |
| 2016/0372968 | A1* | 12/2016 | Yamashina | G03G 15/5004 |
| 2019/0281177 | A1* | 9/2019 | Yashima | H04N 1/00697 |
| 2019/0394349 | A1* | 12/2019 | Nakao | H04N 1/00323 |

FOREIGN PATENT DOCUMENTS

JP 2020093503 6/2020

* cited by examiner

*Primary Examiner* — Cheukfan Lee
(74) *Attorney, Agent, or Firm* — JCIPRNET

(57) ABSTRACT

An apparatus having a human detection function includes: a housing having an exterior part; a human detection sensor that detects a human; and a detection window which is disposed at a portion of the exterior part, and allows a detection wave used by the human detection sensor to pass through. The exterior part has a recessed portion where the detection window is disposed, and the recessed portion is a groove which extends to ends of the exterior part, which are provided in a right-left direction, and the groove has dimensions such that a groove length is longer than a groove width.

20 Claims, 16 Drawing Sheets

FIG. 1
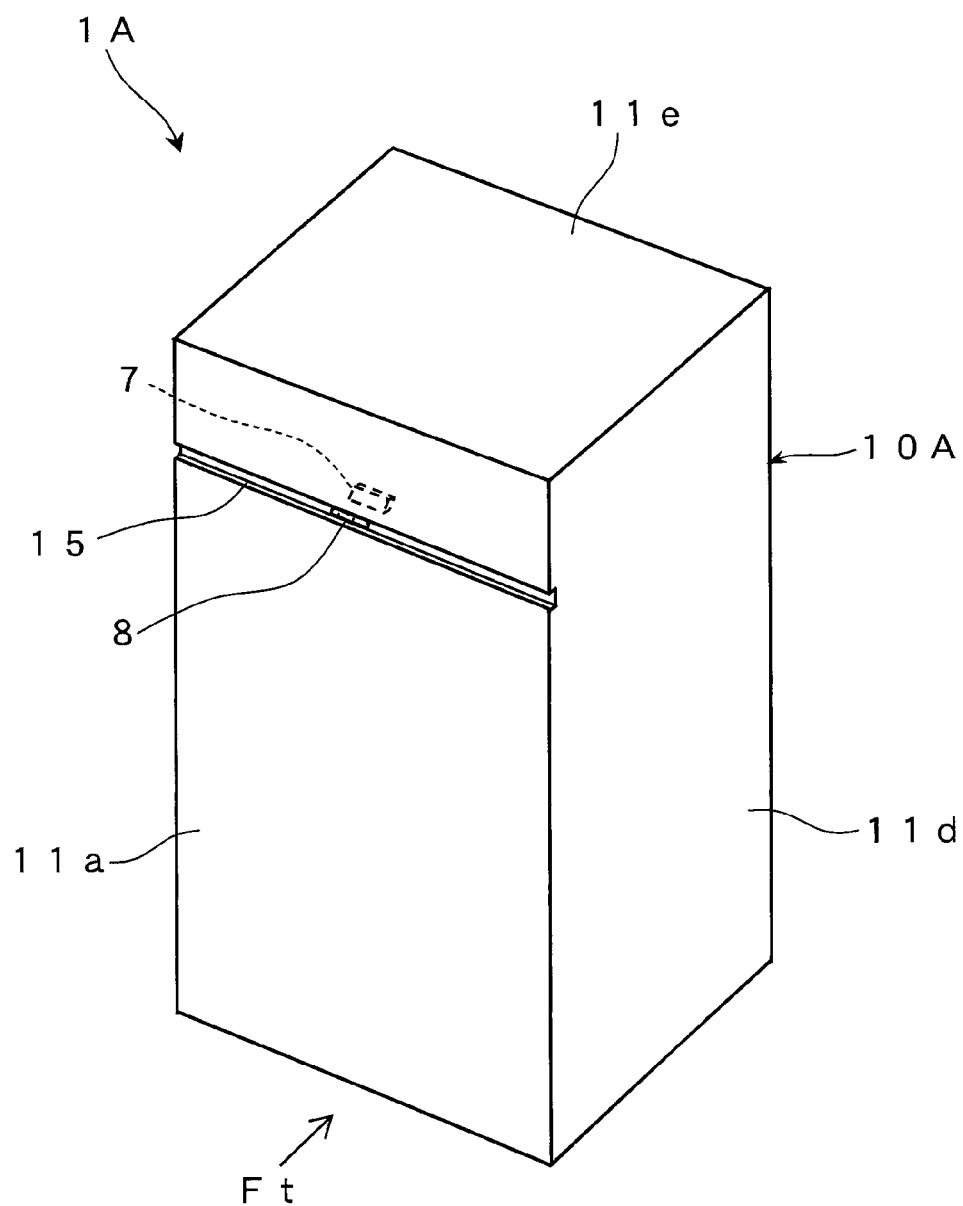
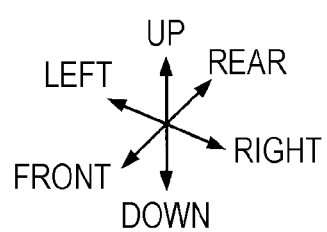

FIG. 2
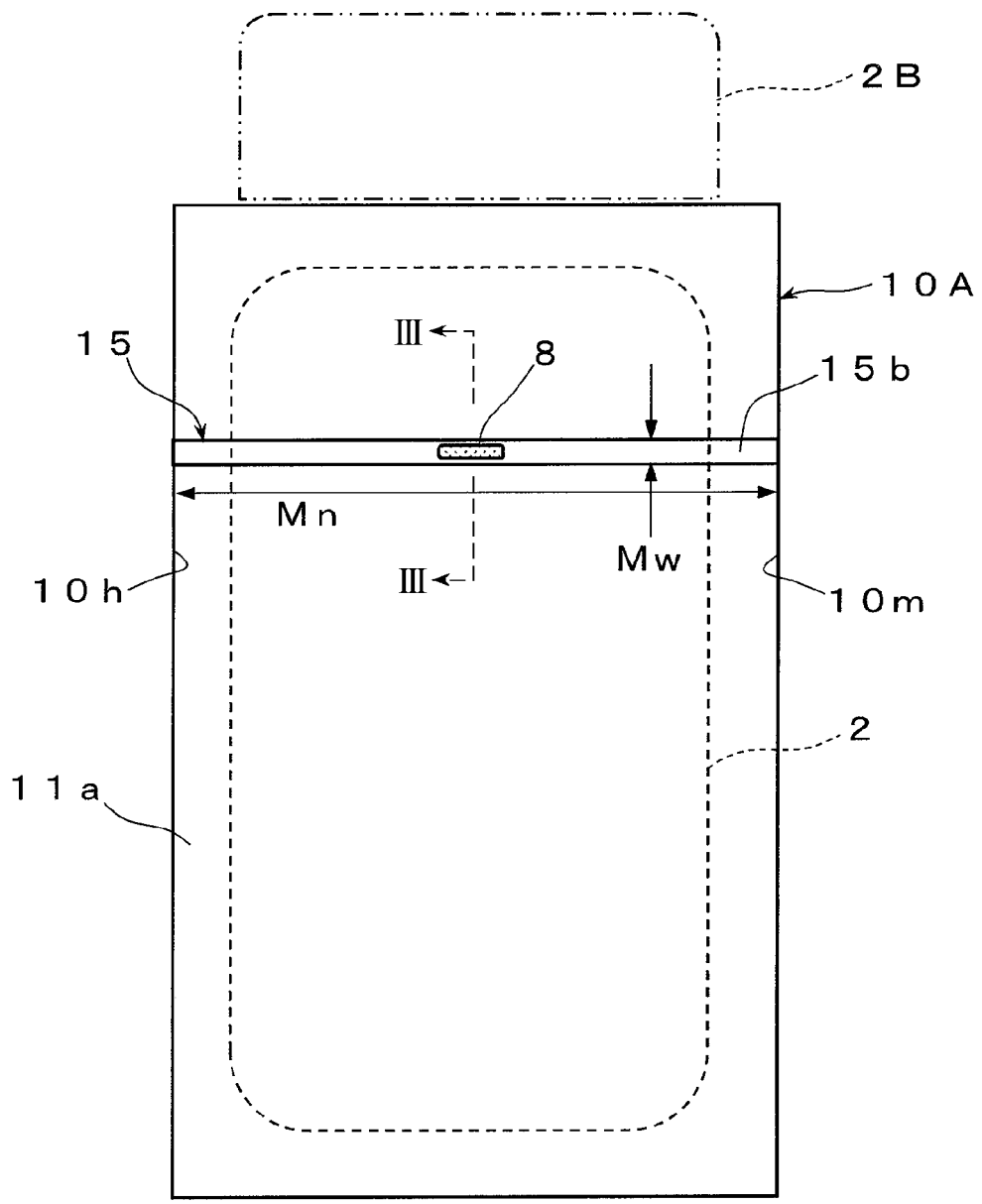
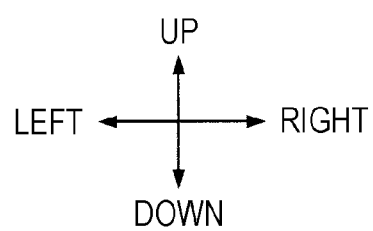

FIG. 3
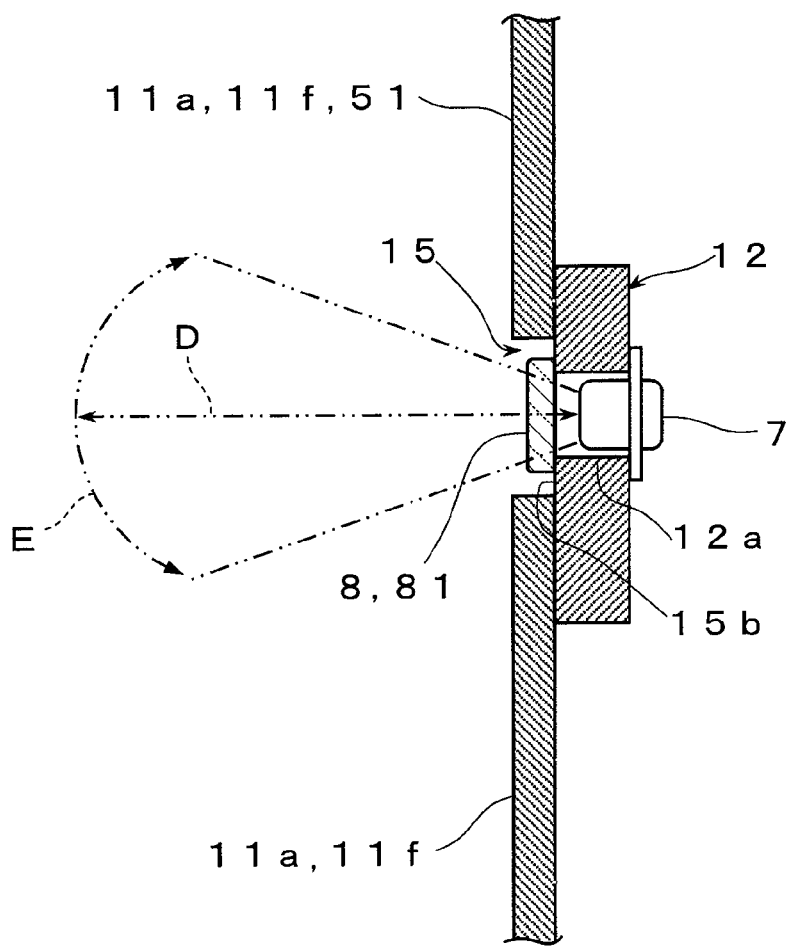
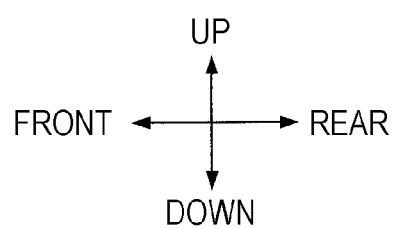

FIG. 7
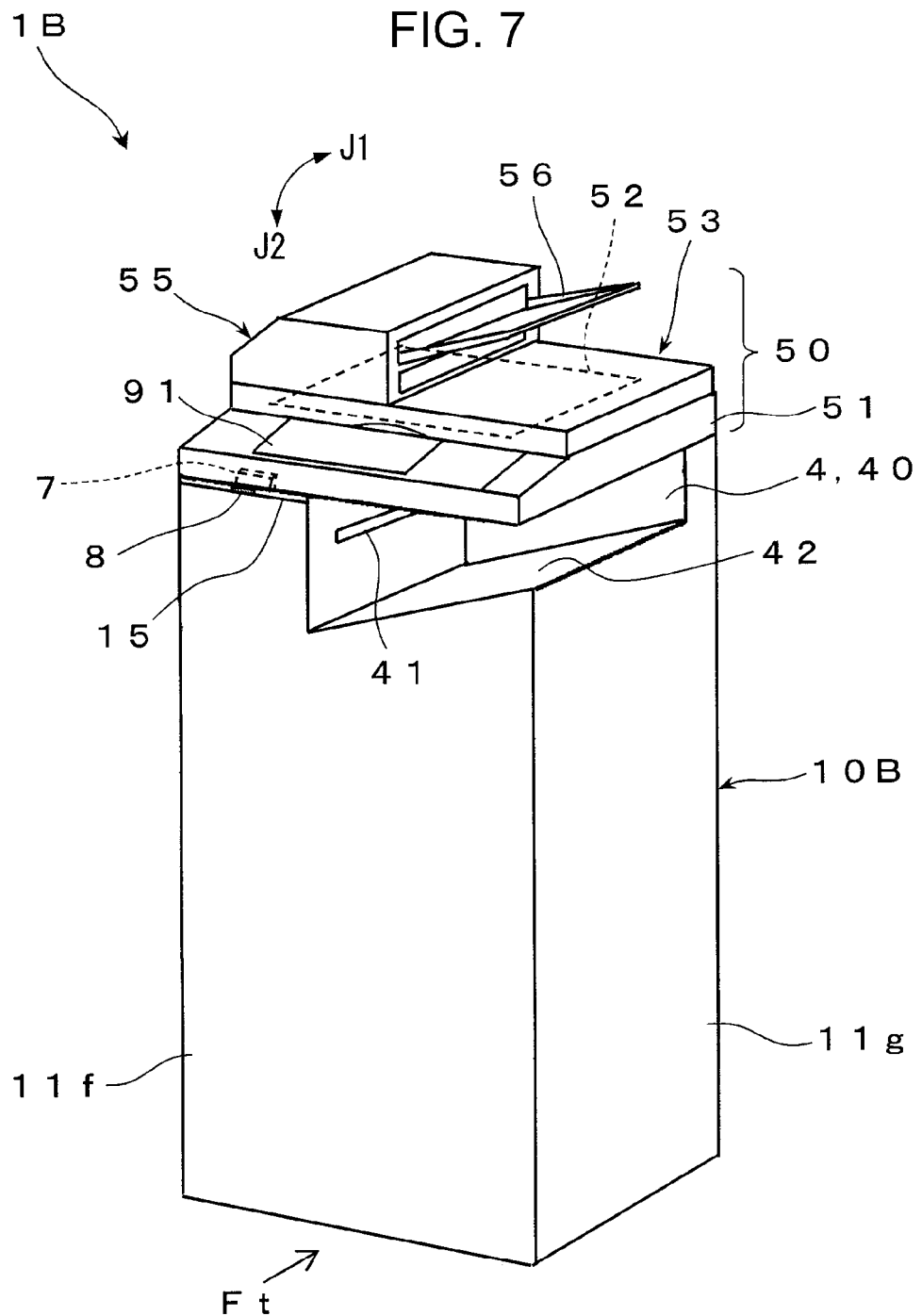
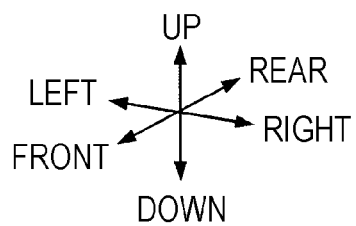

FIG. 8
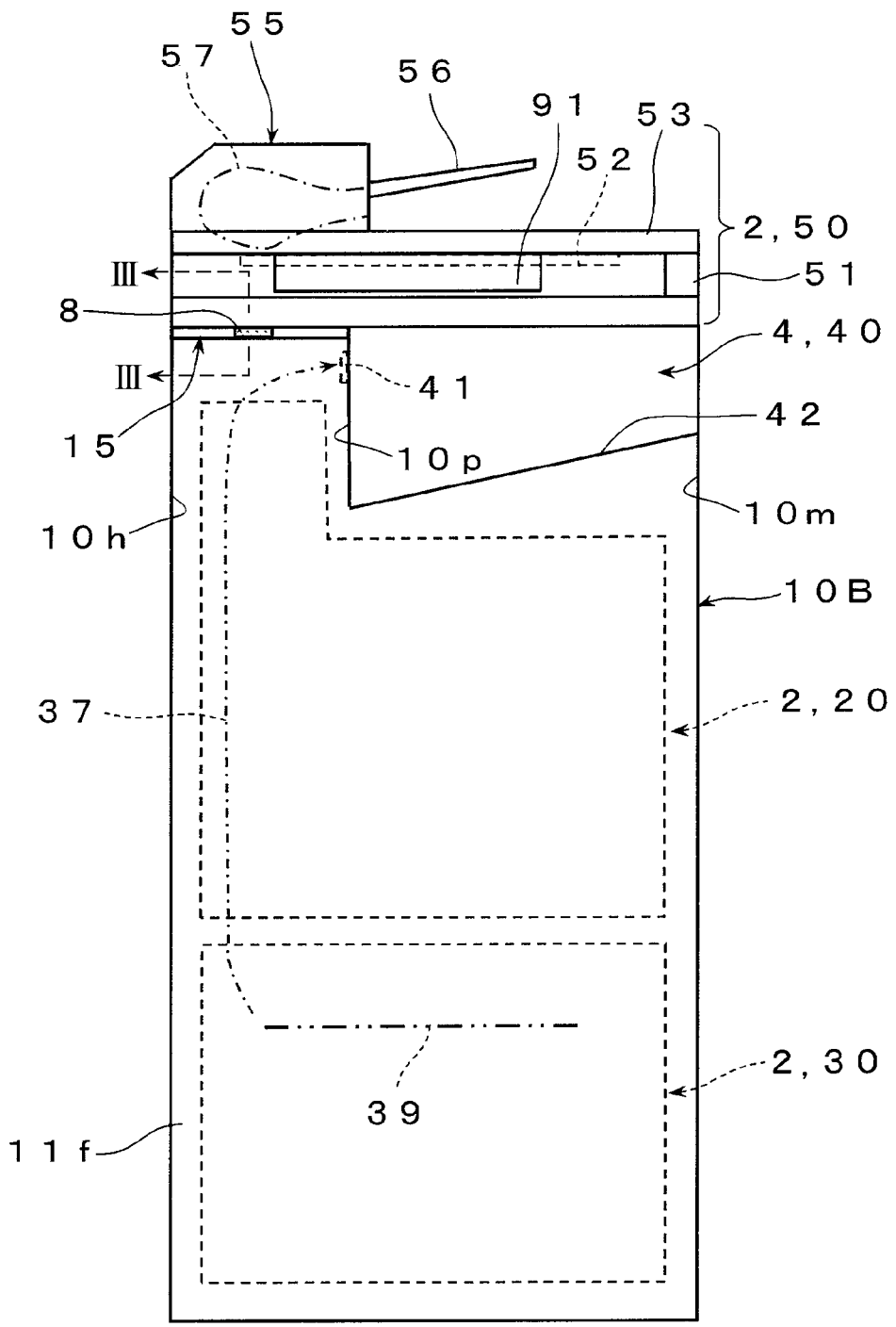
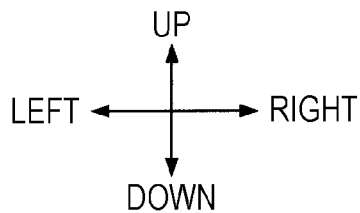

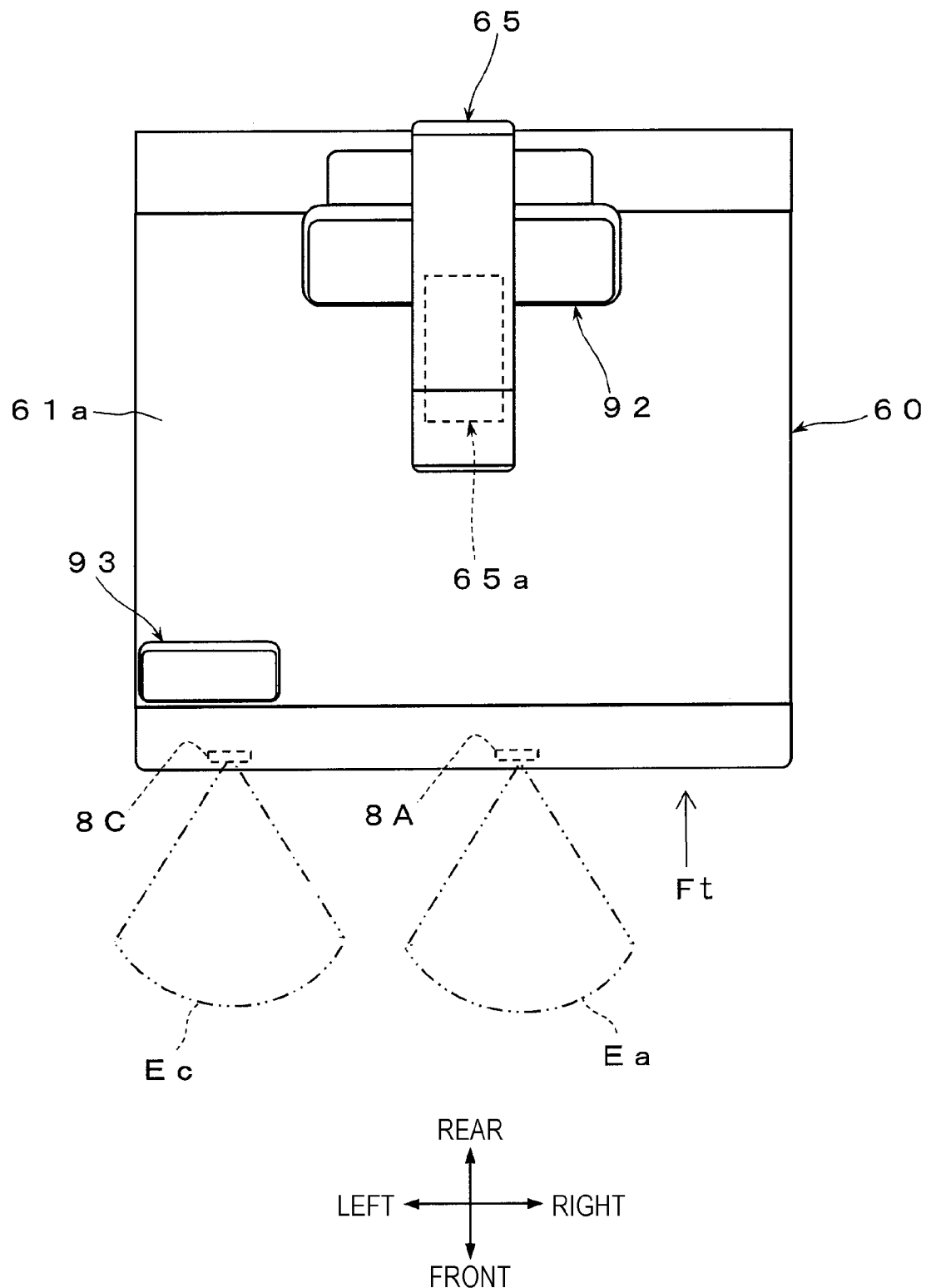

APPARATUS HAVING HUMAN DETECTION FUNCTION

CROSS-REFERENCE TO RELATED APPLICATIONS

This application is based on and claims priority under 35 USC 119 from Japanese Patent Application No. 2021-135285 filed Aug. 23, 2021.

BACKGROUND

(i) Technical Field

The present disclosure relates to an apparatus having a human detection function.

(ii) Related Art

Japanese Unexamined Patent Application Publication No. 2020-93503 (claims 1, 2, FIG. 2) describes an image forming apparatus including a human detecting sensor. It is also stated that when the presence of a user is not detected by a human detection sensor in an intermediate stage in a series of operations of the image forming apparatus, and a predetermined automatic clear time elapses, automatic clear is performed. The image forming apparatus only includes a first human detection sensor disposed as the human detection sensor in the range of an area of an operation member or a sheet discharger in the image forming apparatus.

SUMMARY

Aspects of non-limiting embodiments of the present disclosure relate to an apparatus having a human detection function, that when a detection window to be disposed at a portion of an exterior part of a housing to allow a detection wave used by a human detection sensor to pass through is disposed in a recessed portion of the exterior part, can cause the recessed portion to give no incongruous feeling as a design, and can make a detection window less noticeable, as compared with when the recessed portion is at the central position of the exterior part and when the recessed portion is a groove having a length slightly longer than the detection window.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an apparatus having a human detection function including: a housing having an exterior part; a human detection sensor that detects a human; and a detection window which is disposed at a portion of the exterior part, and allows a detection wave used by the human detection sensor to pass through, wherein the exterior part has a recessed portion where the detection window is disposed, and the recessed portion is a groove which extends to ends of the exterior part, which are provided in a right-left direction, and the groove has dimensions such that a groove length is longer than a groove width.

BRIEF DESCRIPTION OF THE DRAWINGS

Exemplary embodiments of the present disclosure will be described in detail based on the following figures, wherein:

FIG. 1 is a perspective view of an apparatus having a human detection function according to a first exemplary embodiment;

FIG. 2 is a schematic front view of the apparatus having a human detection function of FIG. 1;

FIG. 3 is a schematic cross-sectional view taken along line of the apparatus of FIG. 2, FIG. 8 and FIG. 11;

FIG. 7 is a perspective view of an image forming apparatus according to a second exemplary embodiment;

FIG. 8 is a schematic front view of the image forming apparatus of FIG. 7;

FIG. 15 is a schematic top view of the image forming apparatus of FIG. 13; and

DETAILED DESCRIPTION

Figure 4A:
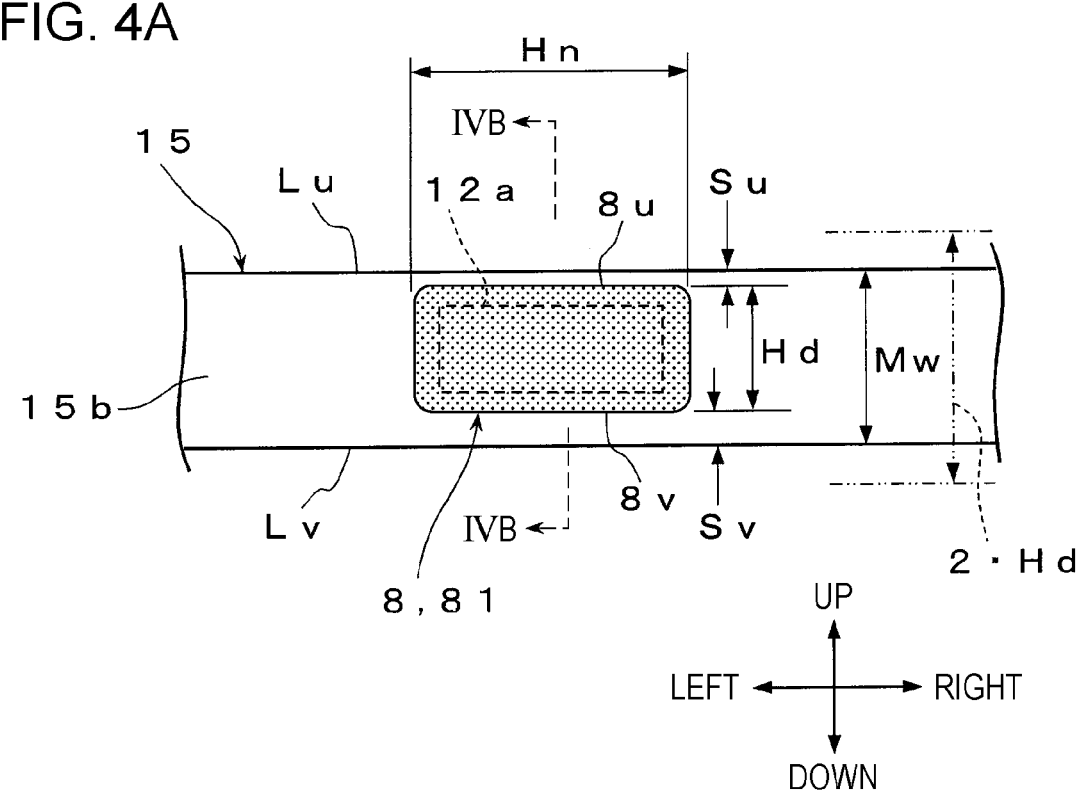
FIG. 4A is an enlarged schematic front view of a disposition state for a recessed portion of a detection window.

Hereinafter an exemplary embodiment for implementing the present disclosure will be described with reference to the drawings.

First Exemplary Embodiment

FIG. 1 is a perspective view, seen from a diagonally forward position, of an apparatus 1A having a human detection function according to a first exemplary embodiment of the present disclosure. FIG. 2 is a schematic front view of the apparatus 1A. The upward and downward, right and left, front and rear directions labeled with arrows in the figures such as FIG. 1 are defined relative to front face Ft of the apparatus 1A for which it is assumed that when using the apparatus 1A, a user stands and faces the apparatus 1A.

As illustrated in FIG. 1, FIG. 2, the apparatus 1A having a human detection function according to the first exemplary embodiment includes a housing 10A having an exterior part (exterior portion), a human detection sensor 7, a detection window 8 disposed at a portion of the exterior part of the housing 10A, and a functional unit 2.

The housing 10A has an internal framework and an external exterior part (exterior portion), and is a structural body having desired structure and shape formed with materials, such as multiple frames, an exterior cover.

As illustrated in FIG. 1, the housing 10A in the first exemplary embodiment is formed as a structure having an appearance in a vertically long cuboid-like shape.

In the housing 10A, the exterior part is configured by exterior covers, for example, a front face cover 11a, a rear face cover, a left lateral face cover, a right lateral face cover 11d, and a top end cover 11e. In the exterior covers, at least part thereof is formed as an opening and closing cover in an openable and closable structure.

The human detection sensor 7 is a detector that detects a human who approaches within a predetermined range of the front face Ft of the housing 10A.

As the human detection sensor 7, a sensor, for example, in the following system is used. Specifically, the human detection sensor 7 is a sensor that detects the presence of a human by emitting detection wave D, such as infrared rays, ultrasonic waves, from an emitting unit to a preset predetermined range (detection area) E, and receiving with a detector the detection wave reflected and returned, and a sensor that detects the presence of a human by receiving with a detector infrared rays, as the detection wave D, emitted from a human who enters a preset predetermined range E.

The human detection sensor 7 is disposed on the inner side of the housing 10A. In addition, for example, as illustrated in FIG. 3, the human detection sensor 7 is mounted on a mounting opening 12a provided in part of a frame 12 disposed on the rear side (rearward) of the front face cover 11a of the housing 10A.

The detection window 8 is a section through which the detection wave D used by the human detection sensor 7 passes, and which has a cover member 81 that covers and closes an opening through which the detection wave D passes.

The opening through which the detection wave D passes is the mounting opening 12a to which the human detection sensor 7 is mounted or an opening provided for allowing the detection wave D to pass through.

The cover member 81 has a shape capable of covering the opening through which the detection wave D passes, and may be a member comprised of a material which allows the detection wave D to pass through. As illustrated in FIG. 3, the cover member 81 may be formed as a body separated from the human detection sensor 7, and in addition, may be formed integrally with the human detection sensor 7.

The shape of the detection window 8, practically, the shape of cover member 81 is set to shape and size necessary for allowing the detection wave D to pass through. The detection window 8 (the cover member 81) in the first exemplary embodiment has a horizontally long rectangle.

The detection window 8 is disposed at a position of the housing 10A necessary for detecting a human who approaches. In the first exemplary embodiment, it is necessary to detect a human who approaches within a predetermined range of the front face Ft of the housing 10A, thus the detection window 8 is disposed at a desired part of the front face cover 11a. Incidentally, an operation unit or a display unit used by a user not illustrated is disposed at an upper portion of the front face cover 11a or a portion outside the upper end of the front face cover 11a of the housing 10A, or at the upper surface of the housing 10A.

The functional unit 2 is a unit comprised of a device having a necessary function corresponding to the usage of the apparatus 1A.

An image former (20) illustrated later may be used as the functional unit 2, and additionally, an automatic selling machine, an automatic cash deposit machine (ATM), an automatic ticketing machine, an information guiding machine, a charging machine, and a terminal machine may be used.

The functional unit 2 does not necessarily have the configuration to which one type of functional unit is applied, and may have the configuration to which multiple types of functional unit coexist and are applied. The functional unit 2 also includes a human detection function provided by the human detection sensor 7.

The shape and size of the housing 10A may be changed depending on the type of the functional unit 2. For example, the overall shape of the housing 10A may be a shape other than a rectangular parallelepiped, or may be shape and size such that a desired shape portion, such as an opening, a recess, is provided in part of the housing 10A.

As illustrated by a chain double-dashed line in FIG. 2, the functional unit 2 may have an external functional unit 2B, part of which is provided so as to be disposed outside the housing 10A. The position where the external functional unit 2B is provided is not limited to the position above the upper end of the housing 10A, and may be, for example, one of lateral positions of the right and left lateral faces of the housing 10A. The external functional unit 2B includes, for example, an operation unit, and a display unit.

As illustrated in FIGS. 1 to 3, in the apparatus 1A having a human detection function, the exterior part of the housing 10A has a recessed portion 15 where the detection window 8 is disposed.

The recessed portion 15 is provided corresponding to a desired position where the detection window 8 is to be disposed.

As illustrated in FIG. 1 and FIG. 2, the recessed portion 15 in the first exemplary embodiment is provided as a groove which extends to the ends of the exterior part of the housing 10A in the right-left direction, and has dimensions such that a groove length Mn is greater than a groove width Mw.

More specifically, the groove that is the recessed portion 15 linearly extends in an elongated manner substantially horizontally in the right-left direction to a left-side end 10h and a right-side end 10m on the outermost side of the housing 10A.

In addition, the groove that is the recessed portion 15 is provided in a state of penetrating the left-side end 10h and the right-side end 10m of the housing 10A. However, the groove that is the recessed portion 15 may be provided in a state of being contact with (in other words, not penetrating) a remaining portion included in the left-side end 10h and the right-side end 10m of the housing 10A. The portion included in the ends 10h, 10m refers to a portion, such as lateral face covers on the right and left, or a frame.

The recessed portion 15 in the first exemplary embodiment may be described from another viewpoint. As illustrated in one of FIG. 2, FIGS. 4A and 4B, the recessed portion 15 is provided as a groove having groove length Mn greater than or equal to five times dimension Hn of the detection window 8 in the direction (the right-left direction in this example) along the groove length Mn.

When the groove has the groove length Mn less than five times the dimension Hn of the detection window 8 in the right-left direction, the recessed portion 15 is formed of a groove having a length slightly longer than the detection window 8, thus it is difficult to make the detection window 8 less noticeable. In the first exemplary embodiment, the groove length Mn of the recessed portion 15 is set to the length which is, for example, six times the dimension Hn of the detection window 8 in the right-left direction.

The recessed portion 15 is provided as a groove having the groove length Mn greater than or equal to 10 times the groove width Mw.

When the groove has the groove length Mn less than 10 times the groove width Mw, the recessed portion 15 is not an elongated groove, and provides unnatural design. In addition, it is also difficult to make the detection window 8 less noticeable. In the first exemplary embodiment, the groove length Mn of the recessed portion 15 is set to the length which is, for example, 12 times the groove width Mw. The groove width Mw of the recessed portion 15 is set to substantially the same dimension over the entire length in the direction (the right-left direction in this example) along the groove length Mn.

Figure 4B:
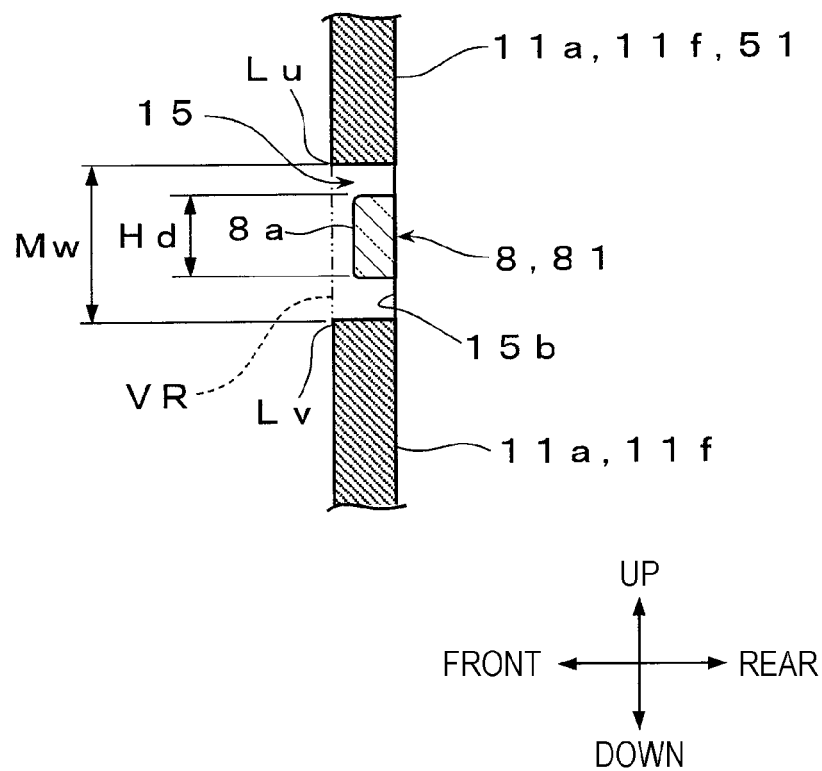
FIG. 4B is a schematic cross-sectional view taken along line B-B of FIG. 4A.

In addition, as illustrated in FIGS. 4A and 4B, the groove of the recessed portion 15 has width Hw less than twice dimension Hd (2·Hd) of the detection window 8 in the width direction (the up-down direction in this example) of the groove. When the width Hw of the groove is greater than or equal to twice the dimension Hd (2·Hd) of the detection window 8, it is difficult to make the detection window 8 less noticeable.

As illustrated in FIG. 3, the recessed portion 15 formed of the groove is provided so that the front face cover 11a is vertically divided at the position where the recessed portion 15 is provided, and the divided areas of the front face cover 11a are mounted so as to be in contact with the frame 12 of the housing 10A with a vertical space needed. Thus, the recessed portion 15 is a groove with a U-shaped longitudinal cross-section along a line in the up-down direction, the longitudinal cross-section having corners bent at substantially right angle.

In addition, for example, the recessed portion 15 may be provided by forming the front face cover 11a into a shape which has the groove of the recessed portion 15.

The recessed portion 15 formed of the groove may also be provided in an exterior cover other than the front face cover 11a, for example, an exterior cover, such as a lateral face cover on the right or left. In this case, another recessed portion provided in an exterior cover other than the front face cover 11a may be provided continuously to the recessed portion 15 provided in the front face cover 11a. When another recessed portion is provided continuously in this manner, as compared with when another recessed portion is not provided, the recessed portion 15 provided in the front face cover 11a brings a unified design which is desirable.

In contrast, as illustrated in FIG. 3, FIGS. 4A and 4B, the detection window 8 is mounted on a bottom face 15b (the front surface of the frame 12 in this exemplary embodiment) of the groove that is the recessed portion 15. As an additional remark, as illustrated in FIG. 3, FIGS. 4A and 4B, the detection window 8 is mounted to cover the mounting opening 12a in the bottom face 15b of the groove. As a method of mounting the detection window 8, a fitting and fixing method, such as snap fitting, and a mounting method, such as a pasting method are used.

As illustrated in FIG. 1 and FIG. 2, the detection window 8 is disposed at substantially the central position in the right-left direction of the groove that is the recessed portion 15. The position where the detection window 8 is disposed is not limited to the central position, and another position appropriate for conditions, such as a range needed for detection may be selected.

As illustrated in FIG. 3 and FIG. 4B, the detection window 8 is disposed in a state of being inside the groove of the recessed portion 15.

As illustrated in FIG. 4B, it may be stated that the detection window 8 is disposed in a state where an outermost surface 8a facing the outside of the groove of the recessed portion 15 does not come in contact with (does not intersect) a virtual line VR connecting contours (edges) Lu, Lv facing each other in a width direction of the groove of the recessed portion 15. From the viewpoint of making the detection window 8 less noticeable by disposing it in the groove of the recessed portion 15, it is desirable to dispose the detection window 8 with the outermost surface 8a of the detection window 8 away from the contours (edges) Lu, Lv of the recessed portion 15 and close to the bottom face 15b of the recessed portion 15.

In addition, as illustrated in FIG. 4A, the detection window 8 is disposed in a state where predetermined spaces Su, Sv are respectively provided from the contours Lu, Lv facing each other in the width direction of the groove that is the recessed portion 15. In the first exemplary embodiment, from the viewpoint of making the detection window 8 less noticeable as seen from a position above the recessed portion 15, the detection window 8 is disposed so that the upper space Su is smaller than the lower space Sv.

In the apparatus 1A having a human detection function in the above-described configuration, when a human such as a user approaches the front face cover 11a of the housing 10A where the detection window 8 is disposed, and enters a detection area E of the human detection sensor 7, the detection wave D necessary for the detector of the human detection sensor 7 is obtained. Consequently, the presence of the human is detected by the apparatus 1A having a human detection function.

When the presence of a human is detected by the human detection sensor 7 in the apparatus 1A having a human detection function, detection information is used as an opportunity (trigger) to change the state of the functional unit 2, for example. The change of the state of the functional unit 2 occurs, for example, when the operation in the functional unit 2 is stopped, and a predetermined time elapses, a power conservation mode (sleep state) shifted is switched to a standby mode (operation stand-by state) due to acquisition of the detection information.

The apparatus 1A having a human detection function has the recessed portion 15, where the detection window 8 is disposed, in the exterior part of the housing 10A. In addition, the recessed portion 15 is provided as a groove which extends to the ends 10h, 10m of the exterior part of the housing 10A in the right-left direction, and has dimensions such that the groove length Mn is longer than the groove width Mw.

Thus, in the apparatus 1A having a human detection function, when the detection window 8 is disposed in the recessed portion provided in the exterior part of the housing 10A, the recessed portion 15 gives no incongruous feeling as a design, and makes the detection window 8 less noticeable, as compared with when the recessed portion is at the central position of the exterior part.

The apparatus 1A having a human detection function has the recessed portion 15, where the detection window 8 is disposed, in the exterior part of the housing 10A. In addition, the recessed portion 15 is provided as a groove having the groove length Mn greater than or equal to five times the dimension Hn of the detection window 8 in the direction along the groove length Mn.

Thus, in the apparatus 1A having a human detection function, when the detection window 8 is disposed in the recessed portion provided in the exterior part of the housing 10A, the recessed portion 15 gives no incongruous feeling as a design, and makes the detection window 8 less noticeable, as compared with when the recessed portion is a groove having a length slightly longer than the detection window 8.

In the apparatus 1A having a human detection function, the recessed portion 15 is provided as a groove which extends in an elongated manner to the left-side end 10h and the right-side end 10m on the outermost side of the exterior part of the housing 10A. Thus, in the apparatus 1A, the recessed portion 15 gives no incongruous feeling as a design, and makes the detection window 8 less noticeable, as compared with when the both ends, located in the right-left direction, of the exterior part of the housing 10A are the right and left ends located inside the exterior part. In this case, the degree of freedom of disposition of the detection window 8 in the right-left direction in the groove of the recessed portion 15 of the housing 10A is increased.

In the apparatus 1A having a human detection function, the groove of the recessed portion 15 is provided such that the groove width Mw (<2·Hd) is less than twice the dimension Hd of the detection window 8 in the width direction of the groove. Thus, in the apparatus 1A, the recessed portion 15 makes the detection window 8 less noticeable, as compared with when the groove of the recessed portion 15 has the groove width Mw greater than or equal to twice the dimension Hd of the detection window 8.

Furthermore, in the apparatus 1A having a human detection function, the detection window 8 is disposed in a state of being inside the groove of the recessed portion 15. Thus, in the apparatus 1A, the recessed portion 15 makes the detection window 8 less noticeable, as compared with when the detection window 8 is disposed in the groove of the recessed portion 15 in a state of being flush with or projecting from the surface of the exterior part of the housing 10A.

Figure 5A:
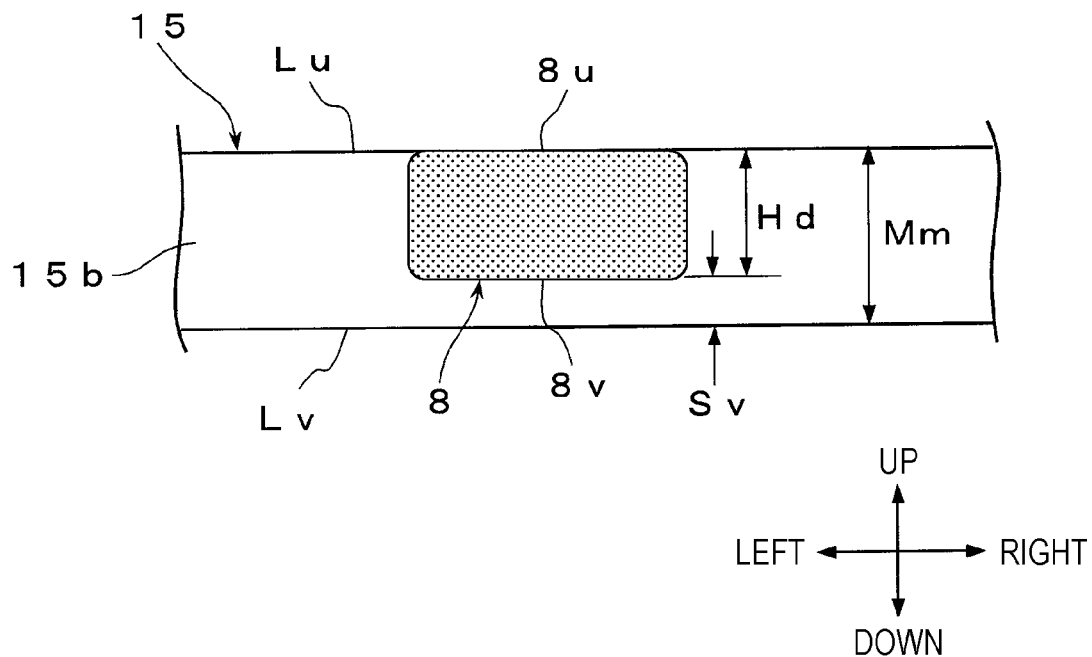
FIG. 5A is an enlarged schematic front view of another configuration of disposition for the recessed portion of the detection window.
Figure 5B:
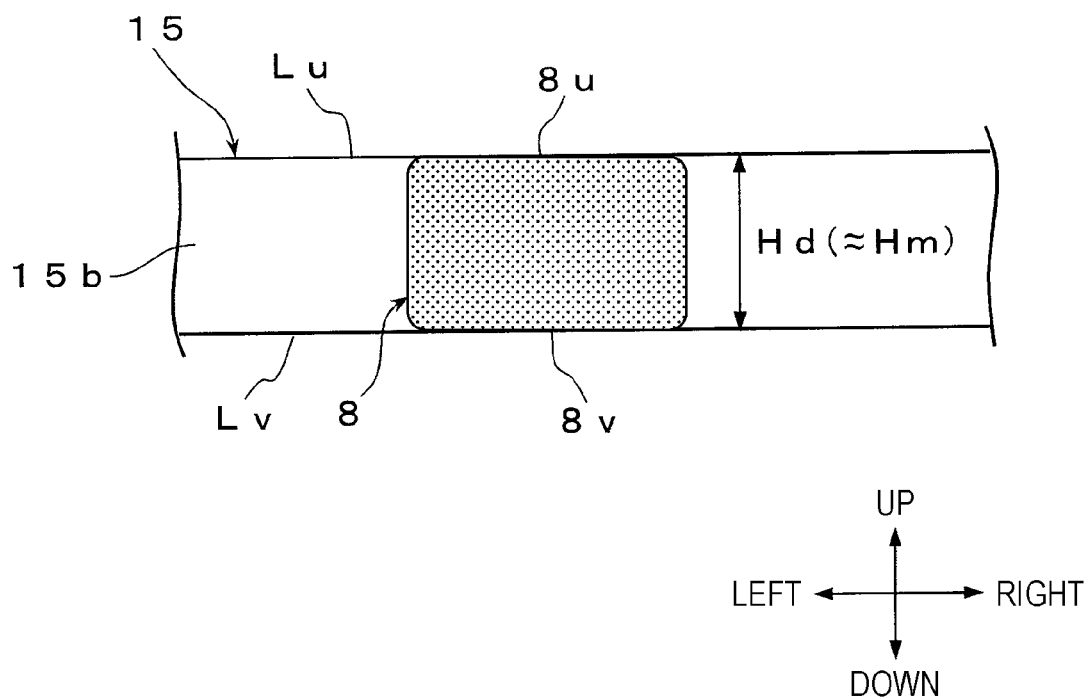
FIG. 5B is an enlarged schematic front view of still another configuration of disposition for the recessed portion of the detection window.

As illustrated in FIG. 5A, the detection window 8 may be disposed in a state of being in contact with one of the contours Lu, Lv facing each other vertically in the width direction of the groove that is the recessed portion 15 (the illustrated example is a configuration example when the detection window 8 is in contact with the upper contour Lu). As illustrated in FIG. 5B, the detection window 8 may be disposed in a state of being in contact with both contours Lu, Lv of the groove that is the recessed portion 15.

The state of the detection window 8 being in contact with the contours Lu, Lv of the groove refers to the state where when the groove is seen from the direct front side, an upper side 8u or a lower side 8v of the detection window 8 is seen substantially overlapping with the contour Lu or Lv of the groove at substantially the same height as the vertical height of the contour Lu or Lv.

In this manner, when the detection window 8 is disposed in a state of being in contact with one or both contours Lu, Lv vertically facing each other of the groove that is the recessed portion 15, the recessed portion 15 makes the detection window 8 much less noticeable, as compared with when the detection window 8 is disposed in a state of being in non-contact with both contours Lu, Lv on the upper side and the lower side of the groove.

The detection window 8 illustrated in FIG. 5A is a configuration example in which the detection window 8 is disposed in a state of being in contact with the upper-side contour Lu of the groove that is the recessed portion 15. In the detection window 8 disposed in this manner, at least part of the detection window 8 is likely to be hidden due to an edge which is formed by the upper-side contour Lu of the groove, and serves as an eaves, thus the recessed portion 15 makes the detection window 8 much less noticeable, as compared with when the detection window 8 is disposed in a state of being in contact with the lower-side contour Lv of the groove. This operation effect is obtained more significantly when the recessed portion 15 is provided at a (height) position of the housing 10A, lower than the eye level of a human such as a user.

Figure 6A:
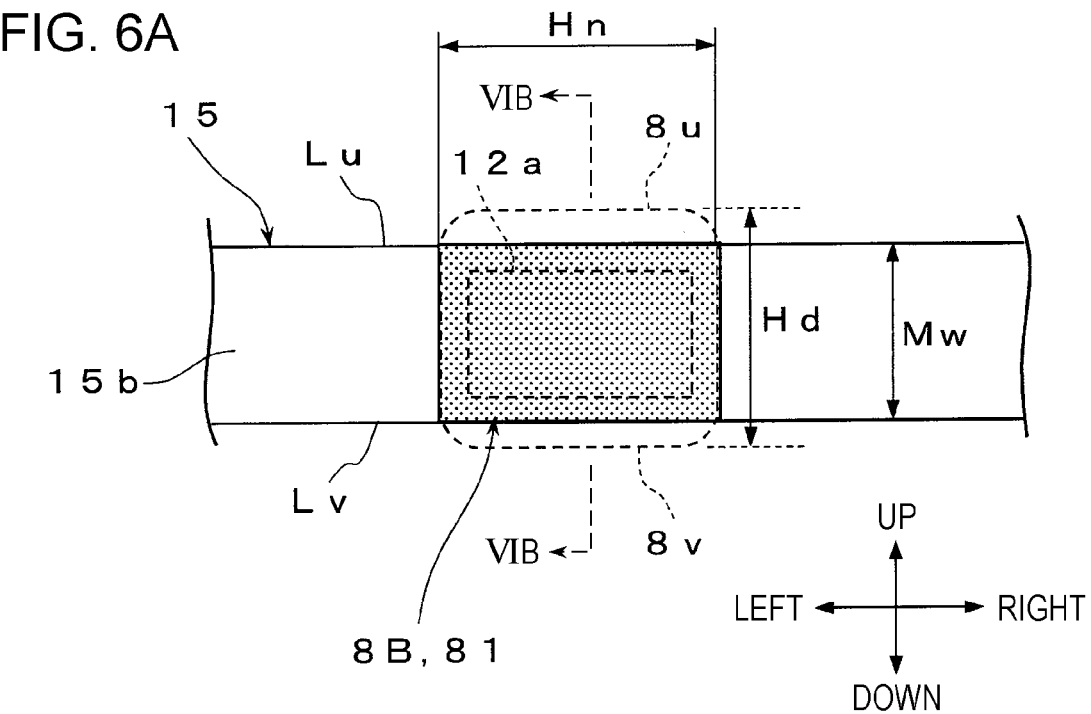
FIG. 6A is an enlarged schematic front view of still another configuration of disposition for the recessed portion of the detection window.
Figure 6B:
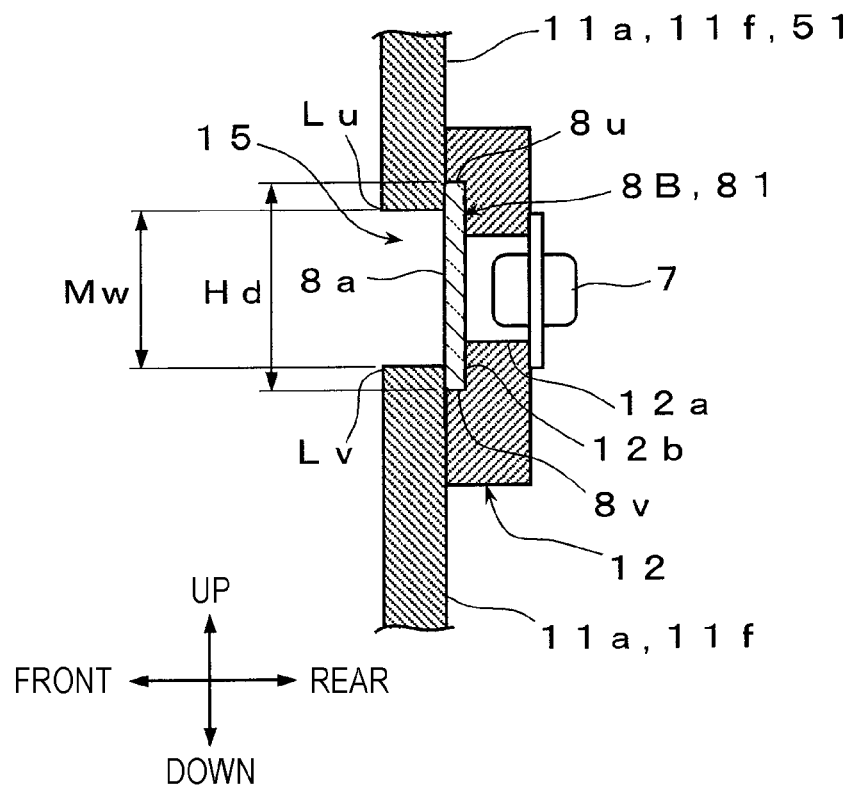
FIG. 6B is a schematic cross-sectional view taken along line B-B of FIG. 6A.

Like the detection window 8B illustrated in FIGS. 6A and 6B, the detection window 8 may be disposed in a state of being inside (rear face side) of the exterior part of the housing 10A, and bridging over both or one of the contours Lu, Lv on both sides facing each other vertically in the width direction of the groove that is the recessed portion 15.

The detection window 8B illustrated in FIGS. 6A and 6B is a configuration example in which the detection window 8B is disposed in a state of bridging over both the upper-side contour Lu and the lower-side contour Lv of the groove that is the recessed portion 15. In this case, the outermost surface 8a facing the outside of the detection window 8 corresponds to the bottom face (15b) of the groove that is the recessed portion 15. The cover member 81 for the detection window 8B is mounted so as to be fitted into a mounting recess 12b which is provided by making a dent in the frame 12 in contact with the front face cover 11a.

Incidentally, when the detection window 8B is disposed in a state of bridging over both the contours Lu, Lv on both sides of the groove that is the recessed portion 15, as illustrated in FIG. 6A, the view of the detection window 8B from the near side of the front face Ft of the apparatus is substantially the same state as the state (FIG. 5B) where the detection window 8 is disposed in contact with the contours Lu, Lv on both sides of the groove that is the recessed portion 15.

In addition, when the detection window 8B is disposed in a state of bridging over one (for example, the upper-side contour Lu) of the contours Lu, Lv on both sides of the groove that is the recessed portion 15, the view from the near side of the front face Ft of the apparatus is substantially the same state as the state (FIG. 5A) where the detection window 8 is disposed in contact with one (for example, upper-side contour Lu) of the contours Lu, Lv on both sides of the groove that is the recessed portion 15.

When the detection window 8 is disposed in this state, the recessed portion 15 gives no incongruous feeling as a design, and makes the detection window 8B less noticeable, as compared with when the detection window 8 is disposed in a state of bridging over both or one of the contours Lu, Lv on both sides on the outer side of the exterior part of the housing 10A, the both sides facing each other in the width direction of the groove that is the recessed portion 15.

In addition, in the apparatus 1A, the recessed portion 15 (at least the bottom face 15b of the groove) may be the same color or the same type of color as the color of the detection window 8. The same type of color refers to, for example, a color adjacent or close to the color in the color wheel. In this configuration, the detection window 8 is influenced by the color of the recessed portion 15, thus becomes less noticeable.

Incidentally, from the viewpoint of preventing the human detection sensor 7 from being seen through from the outside, the detection window 8, specifically, the cover member 81 often has a dark color (for example, black) which has a low degree of brightness, and gives a dark feeling. When the detection window 8 is, for example, semi-transparent black, at least the bottom face 15b of the recessed portion 15 may be black color or dark gray color.

Second Exemplary Embodiment

Figure 9:
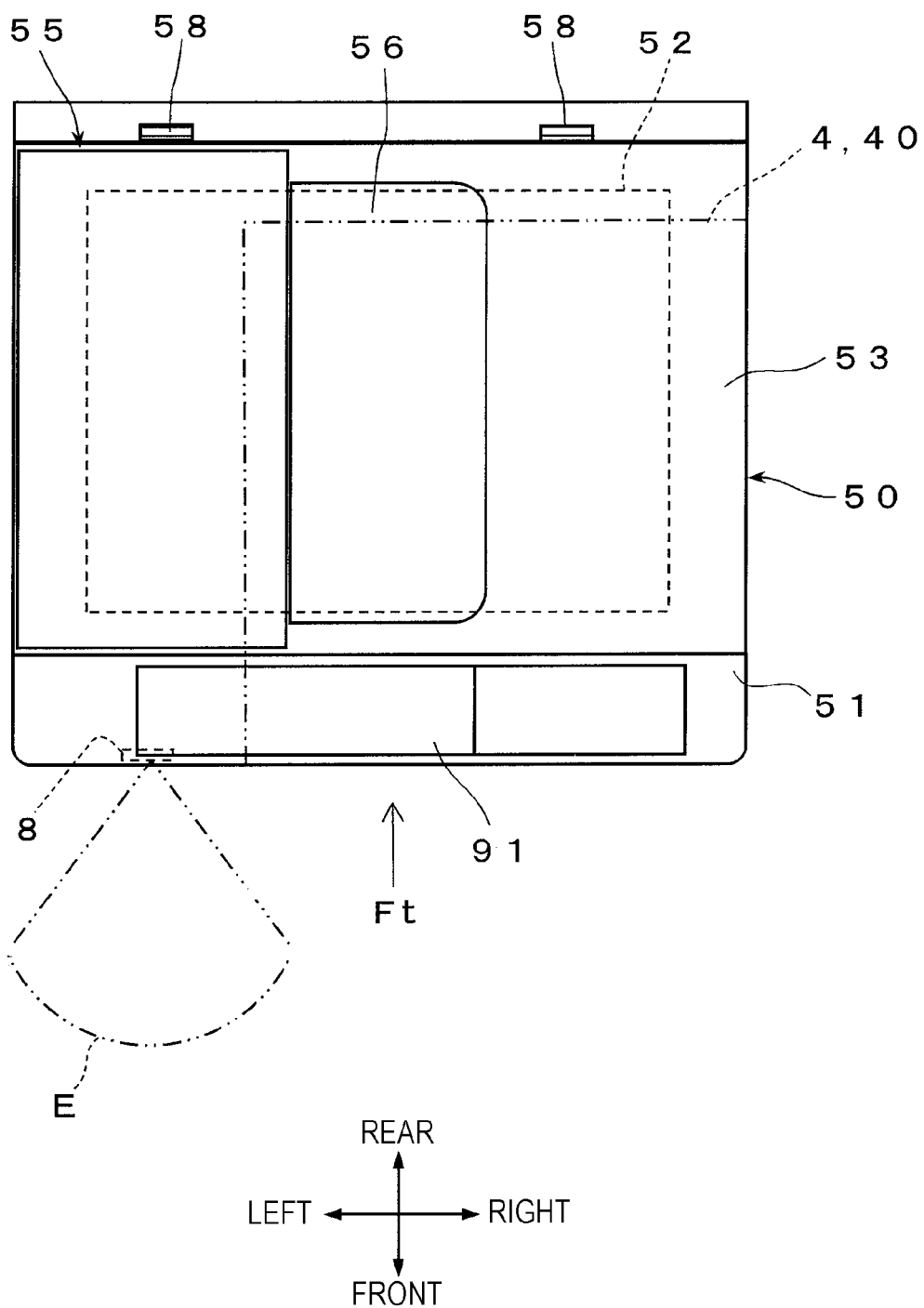
FIG. 9 is a schematic top view of the image forming apparatus of FIG. 7.

FIG. 7 is a perspective view, seen from a diagonally forward position, of an image forming apparatus 1B which is an example of an apparatus having a human detection function according to a second exemplary embodiment of the present disclosure. FIG. 8 is a schematic front view of the image forming apparatus 1B. FIG. 9 is a schematic top view of the image forming apparatus 1B.

As illustrated in FIG. 7 or FIG. 8, the image forming apparatus 1B according to the second exemplary embodiment is configured in the same manner as the image forming apparatus 1A according to the first exemplary embodiment except that a housing 10B provided with a medium discharger 4 is included, and an image former 20, a medium supply unit 30 and a document reader 50 are used and changed as the functional unit 2.

Thus, in the following description, common components are similarly labeled with corresponding symbols used in the first exemplary embodiment, and a description thereof is omitted unless it is necessary.

The housing 10B is configured in substantially the same manner as the housing 10A in the first exemplary embodiment, but mostly differs from the housing 10A in that the housing 10B has a shape provided with the medium discharger 4 formed by a body space to which a recording medium 39 is discharged, on which an image is formed by the image former 20.

Thus, as illustrated in FIG. 7, the housing 10B is formed as a structure having the entire appearance in a vertically long cuboid-like shape which is substantially the same as the housing 10A in the first exemplary embodiment. In the housing 10B, the section, provided with the medium discharger 4, of the exterior cover uses a front cover 11f and a right lateral face cover 11g which have a slightly different shape from the shape of the front face cover 11a and the right lateral face cover 11d in the first exemplary embodiment. The slightly different shape is obtained by cutting off the section provided with the medium discharger 4.

For example, the front face cover 11f is configurated as an opening and closing cover by which the portion of the housing 10B, excluding the medium discharger 4 and the document reader 50, can be opened and closed. The front face cover 11f as the opening and closing cover may be an opening and closing cover having a shape also excluding the portion where the medium supply unit 30 of the housing 10B is provided. The front face cover 11f in this case is an opening and closing cover by which the portion of the housing 10B, provided with the image former 20 is opened and closed.

The medium discharger 4 is provided at a diagonally upward right position of the image former 20. The medium discharger 4 is formed as a discharge space 40 which is present on the upper side of the front face Ft of the housing 10B. The discharge space 40 of the medium discharger 4 is the space open to the outside through a front opening and a side opening, the front opening being deviated to the right on the front face of the housing 10B, the side opening being open continuously from the front opening to the right lateral face of the housing 10B.

The medium discharger 4 is provided with a discharge outlet 41 of the recording medium 39 in the left-side inner wall surface of the discharge space 40. The medium discharger 4 is provided with a stacking surface 42 for stacking and storing the recording medium 39 at the bottom face of the discharge space 40, the recording medium 39 being discharged from the discharge outlet 41. The stacking surface 42 is formed as, for example, an inclined surface rising upward with distance from the discharge outlet 41 in the right direction, in short, formed as a positively sloped surface.

The image former 20 in the functional unit 2 has a device for forming an image corresponding to image information on the recording medium 39.

The image former 20 is configured using an electrophotographic image producing device that finally forms an image including developer on the recording medium 39.

The image former 20 comprised of an electrophotographic image producing device includes the following components (each of which is not illustrated): an image carrier, such as a photoreceptor having a surface which carries an image; devices such as a charging device, an exposure device, a developing device, and a transfer device which are disposed around the image carrier; and a fixing device disposed at a position apart from the image carrier. The image former 20 also includes devices, such as a developer supply device, an image processing device, and a control device.

Of these devices, one of the following is adopted as the transfer device: a direct-transfer device that directly transfers an image including developer formed in the image carrier to the recording medium 39, and an intermediate transfer device that transfers the image to the recording medium 39 by relaying the image to an intermediate transfer body from the image carrier.

The image former 20 has a function of forming an image corresponding to image information input from an external device, such as an information terminal connected to the image forming apparatus 1B; and a function of obtaining information on a document read by the document reader 50 as image information and forming an image corresponding to the image information.

Thus, in the image producing device of the image former 20, a charging operation on the image carrier, an exposure operation, a developing operation, and a transfer operation which correspond to the image information are performed in that order. Consequently, in the image former 20, an image including developer is formed in the image carrier, and subsequently the image is transferred from the image carrier to the recording medium 39. Then in the image former 20, a fixing operation is performed on the recording medium 39 to which the image has been transferred, thus the image is fixed to the recording medium 39. The recording medium 39 on which the image is formed by the fixing is finally discharged to the medium discharger 4.

The medium supply unit 30 is a unit that stores the recording medium 39, and supplies the recording medium 39 to the image former 20.

The medium supply unit 30 is disposed below the image former 20. The medium supply unit 30 includes the following components (each of which is not illustrated): a storage body, such as a tray, that stores the recording medium 39; and a device, such as a feeding device that feeds the recording medium 39 from the storage body.

The storage body is mounted to allow storage work for the recording medium 39 by drawing the storage body from the inner side to the outer side of the housing 10B. The storage body is not necessarily a single storage body, and multiple storage bodies may be provided. The feeding devices are disposed which are equal in number to the storage bodies.

For example, a medium, such as sheet-like regular paper, coated paper, thick paper in a predetermined size is used as the recording medium 39.

In the medium supply unit 30, the recording medium 39 needed is fed to the image former 20 in accordance with a transfer operation in the image former 20. A symbol 37 shown by a dashed-dotted line in FIG. 8 indicates a chief medium transport path along which the recording medium 39 is transported from the medium supply unit 30 to the discharge outlet 41 in the medium discharger 4 through part (section that transfers an image to the recording medium 39) of the image former 20.

The document reader 50 in the functional unit 2 has a device that reads a sheet-like document.

The document reader 50 includes an image reader 51, a platen covering part 53, and an automatic document feeder 55. The image reader 51 has a platen glass 52 serving as a document reading stand on which a document is placed, and a reading device that reads a document placed on the platen glass 52. The platen covering part 53 is a component that openably covers the platen glass 52. The platen covering part 53 is coupled to the image reader 51 by a hinge 58 (see FIG. 9) at a rearward position, and mounted rotatably in opening and closing directions shown by arrows J1, J2 with the hinge 58 serving as a fulcrum.

The automatic document feeder 55 is a device that is disposed on the platen covering part 53 and automatically transports multiple document sheets to enable continuous reading. The automatic document feeder 55 uses a method of reading by an image sensor disposed on a transport path for documents, and a method of reading using a reading device in the image reader 51. A symbol 57 shown by a dashed-dotted line in FIG. 8 indicates a chief document transport path along which a document is transported by the automatic document feeder 55.

The automatic document feeder 55 and the platen covering part 53 may be regarded as an external functional unit 2B disposed externally above the housing 10A described in the first exemplary embodiment.

The document reader 50 can read a document on the platen glass 52 or can continuously read a document by the automatic document feeder 55. In addition, the document reader 50 is assumed to transmit information on the read document from the image reader 51 to the image former 20 as image information.

In the document reader 50, a control panel 91 to operate the image forming apparatus 1B is disposed at the front end of the image reader 51. In addition to mechanical operating portions, such as a button, a switch, the control panel 91 includes a display unit, such as a touch-sensitive liquid crystal panel capable of displaying and operating a screen display unit, and an operation screen.

As illustrated in FIG. 7, the image forming apparatus 1B includes the human detection sensor 7, and the detection window 8 disposed at a portion of the exterior part of the housing 10B. Furthermore, the image forming apparatus 1B has the recessed portion 15, where the detection window 8 is disposed, in the exterior part of the housing 10B.

As illustrated in FIG. 7, FIG. 8, the recessed portion 15 of these components is provided at the portion corresponding to the boundary between the image former 20 and the document reader 50 of the exterior part of the housing 10B.

The recessed portion 15 in the second exemplary embodiment is provided as an elongated groove extending from the left-side end 10h to a right-side inner end 10p inside the exterior part as seen from the front face Ft of the housing 10B. The recessed portion 15 is formed as a groove relatively shorter than the recessed portion 15 (see FIG. 1, FIG. 2, FIG. 10, FIG. 11) formed of an elongated groove extending from the left-side end 10h to the right-side end 10m of the housing 10B.

The recessed portion 15 may be described from another viewpoint. As illustrated in FIG. 8, the recessed portion 15 is provided also as a groove having the groove length Mn greater than or equal to five times the dimension Hn of the detection window 8 in the direction (the right-left direction in this example) along the groove length Mn (see FIG. 2 and FIGS. 4A and 4B). In the second exemplary embodiment, the groove length Mn of the recessed portion 15 is set to the length, for example, five times the dimension Hn of the detection window 8 in the right-left direction.

Furthermore, other configurations of the recessed portion 15 are substantially the same as the configuration of the recessed portion 15 in the first exemplary embodiment.

The configuration of the disposition of the human detection sensor 7, the detection window 8, and the recessed portion 15 of the detection window 8 in the image forming apparatus 1B is substantially the same as the configuration of the disposition of the human detection sensor 7, the detection window 8, and the recessed portion 15 of the detection window 8 in the apparatus 1A according to the first exemplary embodiment (see also FIGS. 2 to FIGS. 5A and 5B).

The image forming apparatus 1B having the above-described configuration has the recessed portion 15, where the detection window 8 is disposed, in the exterior part of the housing 10B. In addition, the recessed portion 15 is provided as a groove which extends to the left-side end 10h and the right-side inner end 10p of the exterior part of the housing 10B in the right-left direction, and has dimensions such that the groove length Mn is longer than the groove width Mw.

Thus, in the image forming apparatus 1B, when the detection window 8 is disposed in the recessed portion provided in the exterior part of the housing 10B, the recessed portion 15 gives no incongruous feeling as a design, and makes the detection window 8 less noticeable, as compared with when the recessed portion is at the central position of the exterior part.

The image forming apparatus 1B has the recessed portion 15, where the detection window 8 is disposed, in the exterior part of the housing 10B. In addition, the recessed portion 15 is provided as a groove having the groove length Mn greater than or equal to five times the dimension Hn of the detection window 8 in the direction along the groove length Mn.

Thus, in the image forming apparatus 1B, when the detection window 8 is disposed in the recessed portion provided in the exterior part of the housing 10B, the recessed portion 15 gives no incongruous feeling as a design, and makes the detection window 8 less noticeable, as compared with when the recessed portion is a groove having a length slightly longer than the detection window 8.

Furthermore, in the image forming apparatus 1B, the recessed portion 15 is provided at the portion corresponding to the boundary between the image former 20 and the document reader 50 of the exterior part of the housing 10B, and the detection window 8 is disposed in the recessed portion 15.

Thus, in the image forming apparatus 1B, the recessed portion 15 doesn't look unnatural, gives no incongruous feeling while improving the quality of appearance, and makes the detection window 8 less noticeable, as compared with when the recessed portion 15 is provided at a portion other than the boundary between the image former 20 and the document reader 50 of the exterior part of the housing 10B.

In addition, even in the image forming apparatus 1B, the above-described operation effect related to the recessed portion 15 and the detection window 8 obtained by the apparatus 1A having a human detection function according to the first exemplary embodiment is similarly obtained.

Third Exemplary Embodiment

Figure 10:
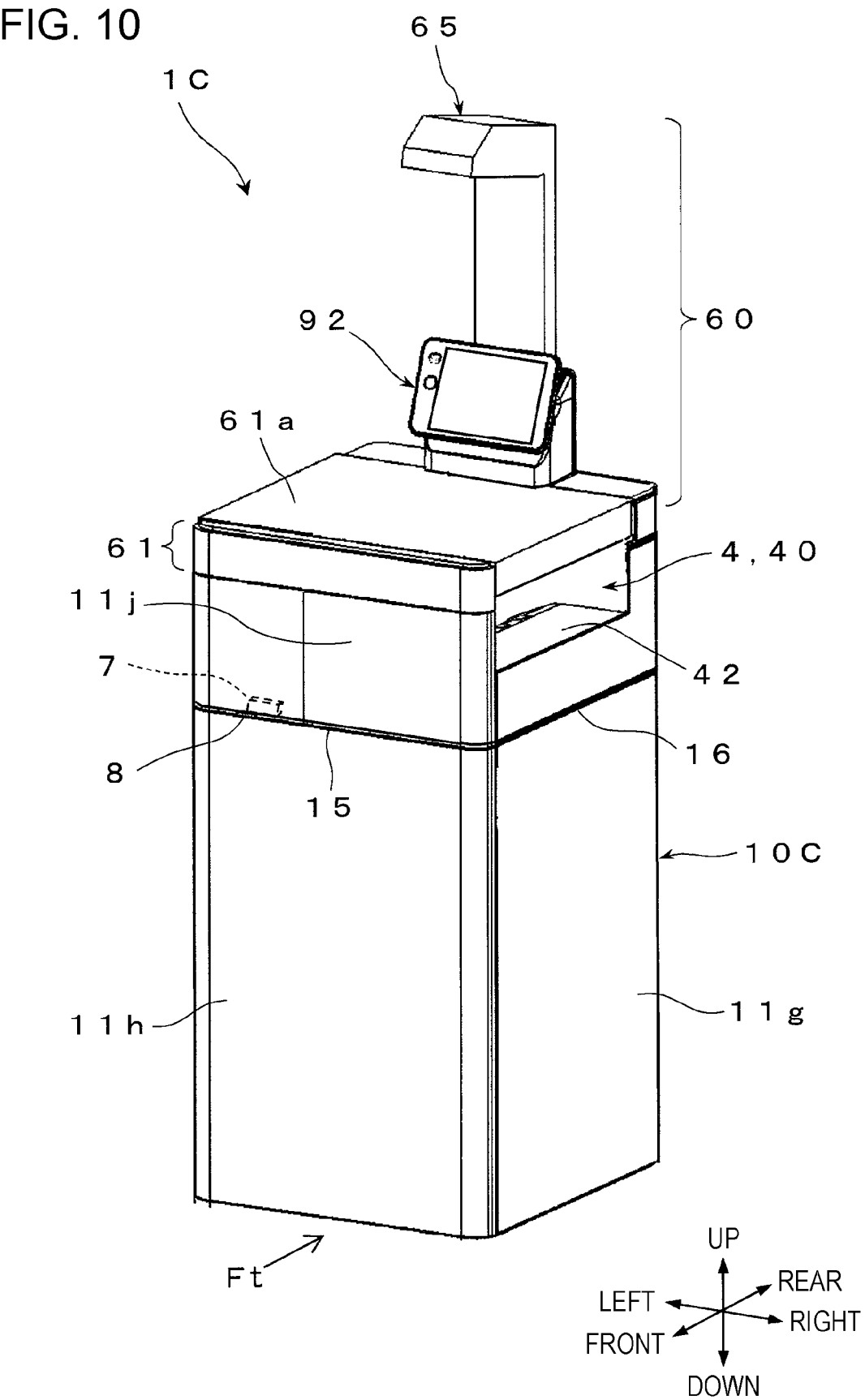
FIG. 10 is a perspective view of an image forming apparatus according to a third exemplary embodiment.
Figure 11:
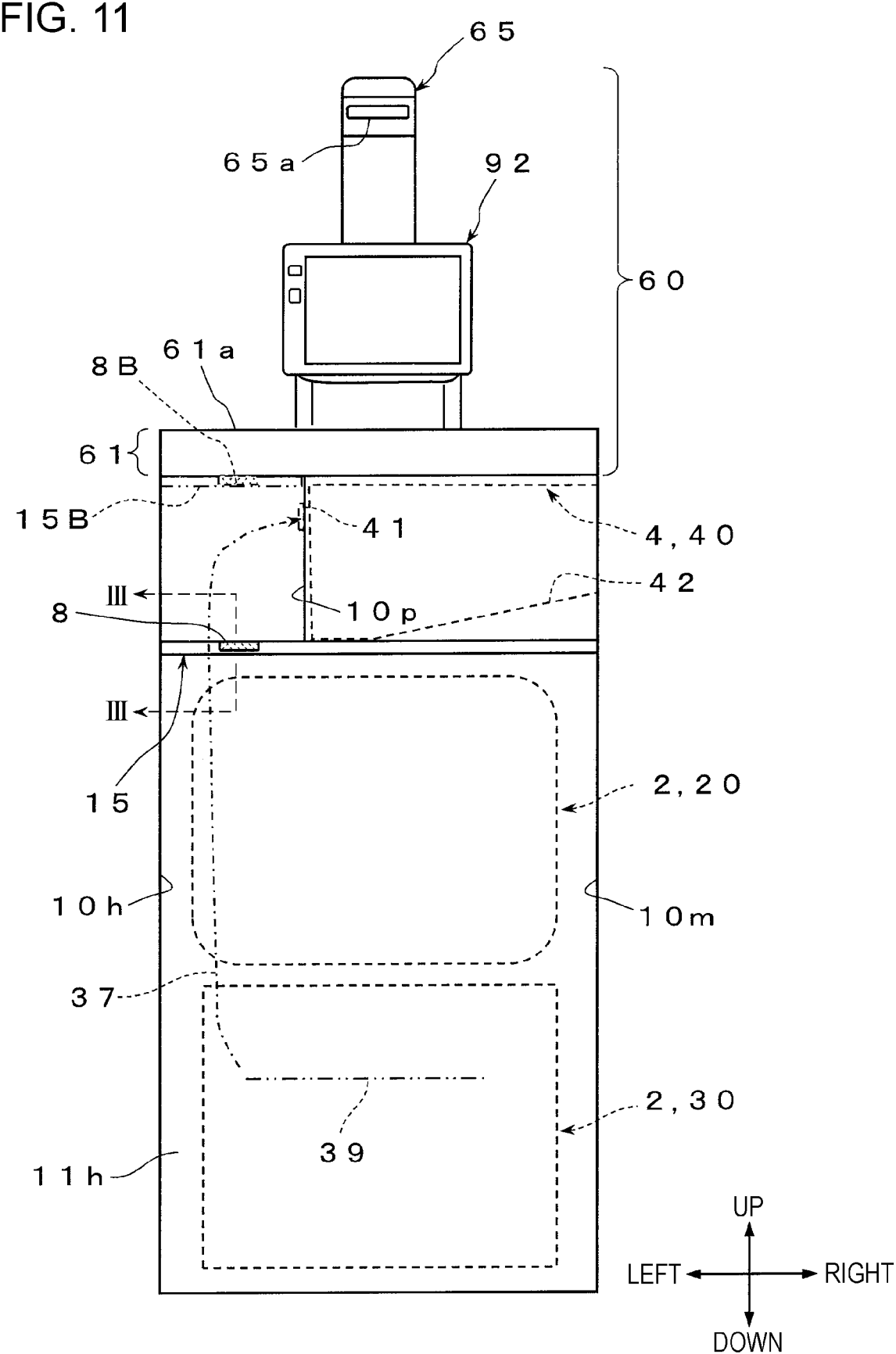
FIG. 11 is a schematic front view of the image forming apparatus of FIG. 10.
Figure 12:
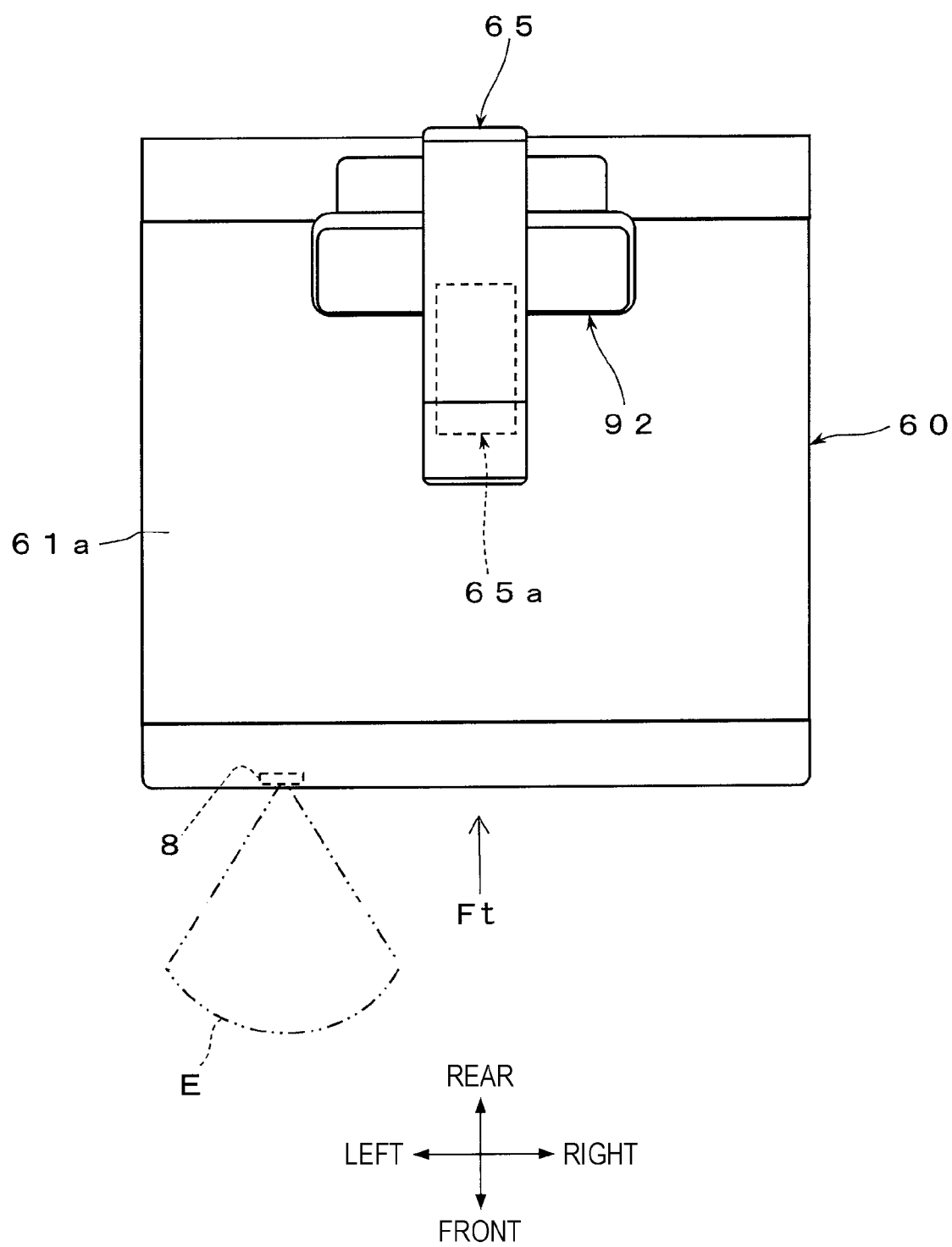
FIG. 12 is a schematic top view of the image forming apparatus of FIG. 10.

FIG. 10 is a perspective view, seen from a diagonally forward position, of an image forming apparatus 1C which is another example of an apparatus having a human detection function according to a third exemplary embodiment of the present disclosure. FIG. 11 is a schematic front view of the image forming apparatus 1C. FIG. 12 is a schematic top view of the image forming apparatus 1C.

The image forming apparatus 1C according to the third exemplary embodiment is configured in the same manner as the image forming apparatus 1B according to the second exemplary embodiment except that an external reader 60 is used instead of the document reader 50 as the functional unit 2, and the housing 10C provided with front cover 11h having a partially different configuration is used and changed.

Thus, in the following description, common components are similarly labeled with corresponding symbols used in the second exemplary embodiment (including the first exemplary embodiment in a strict sense), and a description thereof is omitted unless it is necessary.

The external reader 60 is a type of a reader that reads a reading target outside the housing 10C. As illustrated in FIG. 10, the external reader 60 includes a stand 61 on which a reading target is placed, and a reading device 65 that reads the reading target placed on the stand 61.

The stand 61 is comprised of a plate-like member having a flat upper surface 61a on which a reading target can be placed in a static state. The stand 61 is mounted on the upper end of the housing 10C so that the upper surface 61a is the uppermost surface of the housing 10C.

The reading target may be an object which is readable by the reading device 65 from above the stand 61 by being placed thereon. For example, the reading target includes a three-dimensional object, such as a book, a magazine, food, a plant, in addition to a sheet-like document on which information on image is recorded.

The reading device 65 includes a reading unit 65a capable of optically reading a reading target placed on the stand 61, and a member mounted to support the reading unit 65a. In the reading device 65 in the third exemplary embodiment, the reading unit 65a is mounted in a posture capable of capturing the space on the stand 61 and is supported in a state of standing upward from the rear end of the stand 61 by a desired length.

A camera is used as the reading unit 65a, the camera being formed by combining, for example, an imaging device such as a charge coupled device (CCD), and an optical element such as a lens. The camera serving as the reading device 65a may be referred to as a document camera. The reading device 65 may include a lighting device that lights up a reading target placed on the stand 61 at the time of reading.

As illustrated in FIG. 10, the reading device 65 is provided with a control panel 92 for operating the image forming apparatus 1C at a position on the base side and the near side of the member supporting the reading device 65a. From the viewpoint of improving the operability of the control panel 92, it is disposed at a position upward away from the stand 61. The control panel 92 chiefly includes a display unit, such as a touch-sensitive liquid crystal panel capable of displaying and operating an operation screen, however may include a mechanical operating portion, such as a button.

The housing 10C is configured in substantially the same manner as the housing 10B, excluding the front cover 11h, in a structure provided with the medium discharger 4 in the second exemplary embodiment.

The front cover 11h is configured as an opening and closing cover by which the whole body below the external reader 60 (the stand 61) can be opened and closed in the housing 10C with the left end serving as a fulcrum, for example. A second opening and closing covering part 11j is provided at a right position above the front cover 11h.

The second opening and closing covering part 11j is configured as an opening and closing cover which is opened or closed to be able to bring the medium discharger 4 to a state of being covered from the front face Ft side and a state of being exposed to the front face Ft side.

The second opening and closing covering part 11j is mounted by a hinge to be openable in the downward direction or the left direction on the near side of the front cover 11h. The second opening and closing covering part 11j may be mounted to be openable by being lowered to the rear side (rearward surface) of the front cover 11h.

As illustrated in FIG. 10, the image forming apparatus 1C includes the human detection sensor 7, and the detection window 8 disposed at a portion of the exterior part of the housing 10C. Furthermore, the image forming apparatus 1C has the recessed portion 15, where the detection window 8 is disposed, in the exterior part of the housing 10C.

As illustrated in FIG. 10, FIG. 11, the recessed portion 15 of these components is provided in the boundary between the image former 20 and the medium discharger 4.

The recessed portion 15 is provided as an elongated groove extending from the left-side end 10h to the right-side end 10m as seen from the front face Ft of the housing 10C.

The recessed portion 15 may be described from another viewpoint. As illustrated in FIG. 10, the recessed portion 15 is provided also as a groove having the groove length Mn greater than or equal to five times the dimension Hn of the detection window 8 in the direction (the right-left direction in this example) along the groove length Mn (see FIG. 2 and FIGS. 4A and 4B). In the third exemplary embodiment, the groove length Mn of the recessed portion 15 is set to, for example, 12 times the dimension Hn in the right-left direction of the detection window 8.

Furthermore, other aspects of the configuration of the recessed portion 15 are substantially the same as those of the configuration of the recessed portion 15 in the first exemplary embodiment.

Similar to the second exemplary embodiment, the configuration of the manner of disposition of the human detection sensor 7, the detection window 8, and the recessed portion 15 of the detection window 8 in the image forming apparatus 1C is substantially the same as the configuration of the manner of disposition of the human detection sensor 7, the detection window 8, and the recessed portion 15 of the detection window 8 in the apparatus 1A according to the first exemplary embodiment (see also FIG. 2 to FIGS. 5A and 5B).

The image forming apparatus 1C having the above-described configuration is also capable of reading information on a reading target into the image former 20 as image information, and forming an image corresponding to the image information in the recording medium 39, the information on the reading target being read by the reading device 65a of the external reader 60. Thus, the image forming apparatus 1C can record and output an image read from a reading target in and from the recording medium 39.

In the image forming apparatus 1C, when the detection window 8 is disposed in the recessed portion provided in the exterior part of the housing 10C, the recessed portion 15 gives no incongruous feeling as a design, and makes the detection window 8 less noticeable, as compared with when the recessed portion is at the central position of the exterior part or when the recessed portion is a groove having a length slightly longer than the detection window 8.

In the image forming apparatus 1C, the recessed portion 15 is provided at the portion corresponding to the boundary between the image former 20 and the medium discharger 4 of the exterior part of the housing 10C, and the detection window 8 is disposed in the recessed portion.

Thus, in the image forming apparatus 1C, the recessed portion 15 doesn't look unnatural, gives no incongruous feeling while improving the quality of appearance, and makes the detection window 8 less noticeable, as compared with when the recessed portion 15 is provided at a portion other than the boundary between the image former 20 and the medium discharger 4 of the exterior part of the housing 10C.

In addition, even in the image forming apparatus 1C, the above-described operation effect related to the recessed portion 15 and the detection window 8 obtained by the apparatus 1A having a human detection function according to the first exemplary embodiment is similarly obtained.

In the image forming apparatus 1C, as illustrated by a chain double-dashed line in FIG. 11, instead of the recessed portion 15, a recessed portion 15B may be used, which is provided at the portion corresponding to the boundary between the image former 20 and the stand 61 of the external reader 60 of the exterior part of the housing 10C, and the detection window 8 may be provided in the recessed portion 15B.

In this configuration, the recessed portion 15B doesn't look unnatural, gives no incongruous feeling while improving the quality of appearance, and makes the detection window 8 less noticeable, as compared with when the recessed portion 15B is provided at a portion unrelated to the boundary between the image former 20 and the stand 61 of the external reader 60 of the exterior part of the housing 10C.

In addition, in the image forming apparatus 1C, as illustrated in FIG. 10, a recessed portion 16 formed of an elongated groove extending linearly in a front-rear direction is provided in the right lateral face cover 11g of the exterior part of the housing 10C. The recessed portion 16 may be provided in the left lateral face cover of the exterior part of the housing 10C. Incidentally, the recessed portion 16 is provided in a state of being continuously connected to the recessed portion 15 in the front cover 11h at the right corner. However, the recessed portion 16 is not necessarily provided in such a state.

In this case, a detection window 8 may be provided in the recessed portion 16, and it is possible to make the detection window 8 less noticeable, too.

Fourth Exemplary Embodiment

Figure 13:
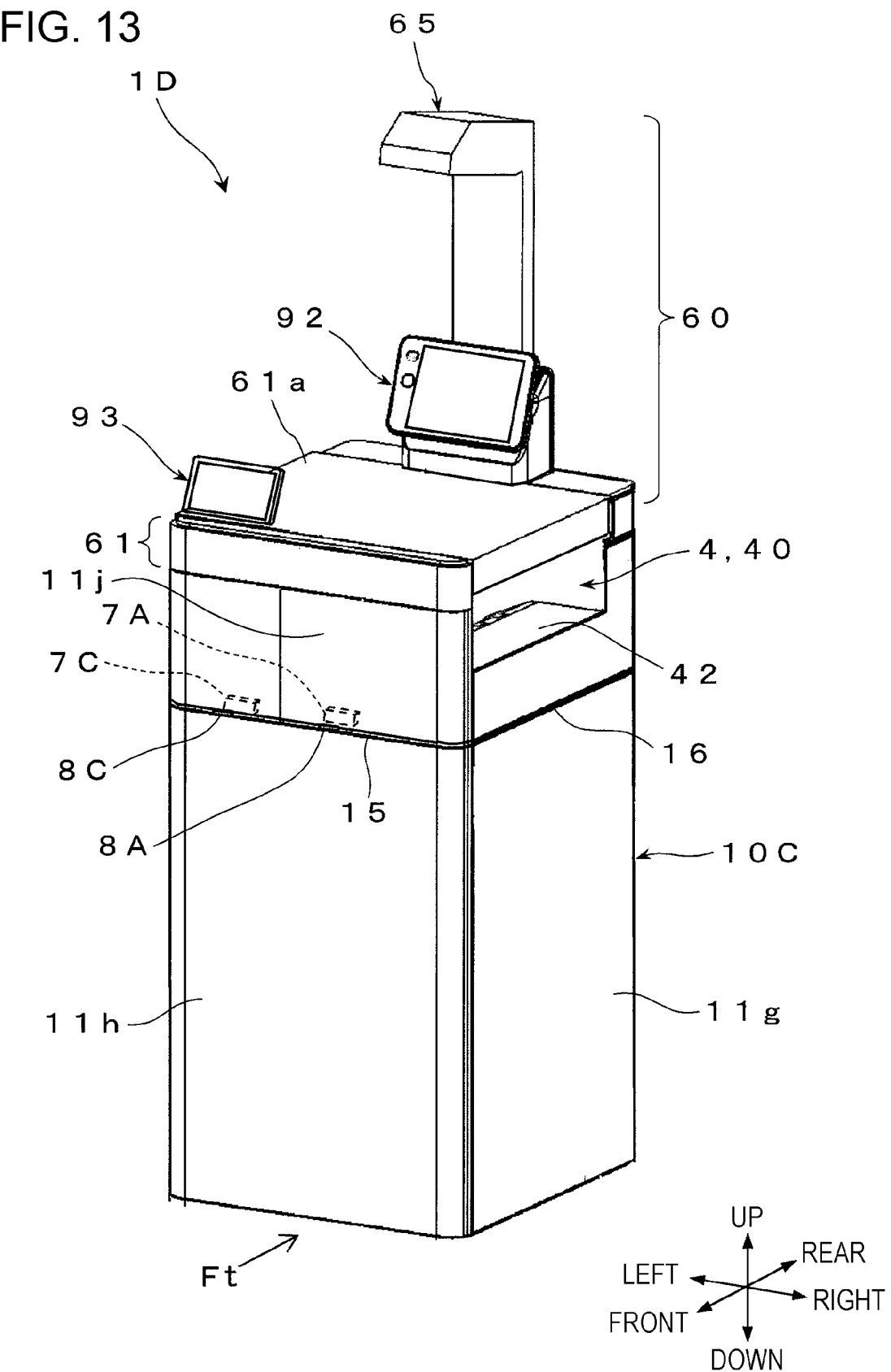
FIG. 13 is a perspective view of an image forming apparatus according to a fourth exemplary embodiment.
Figure 14:
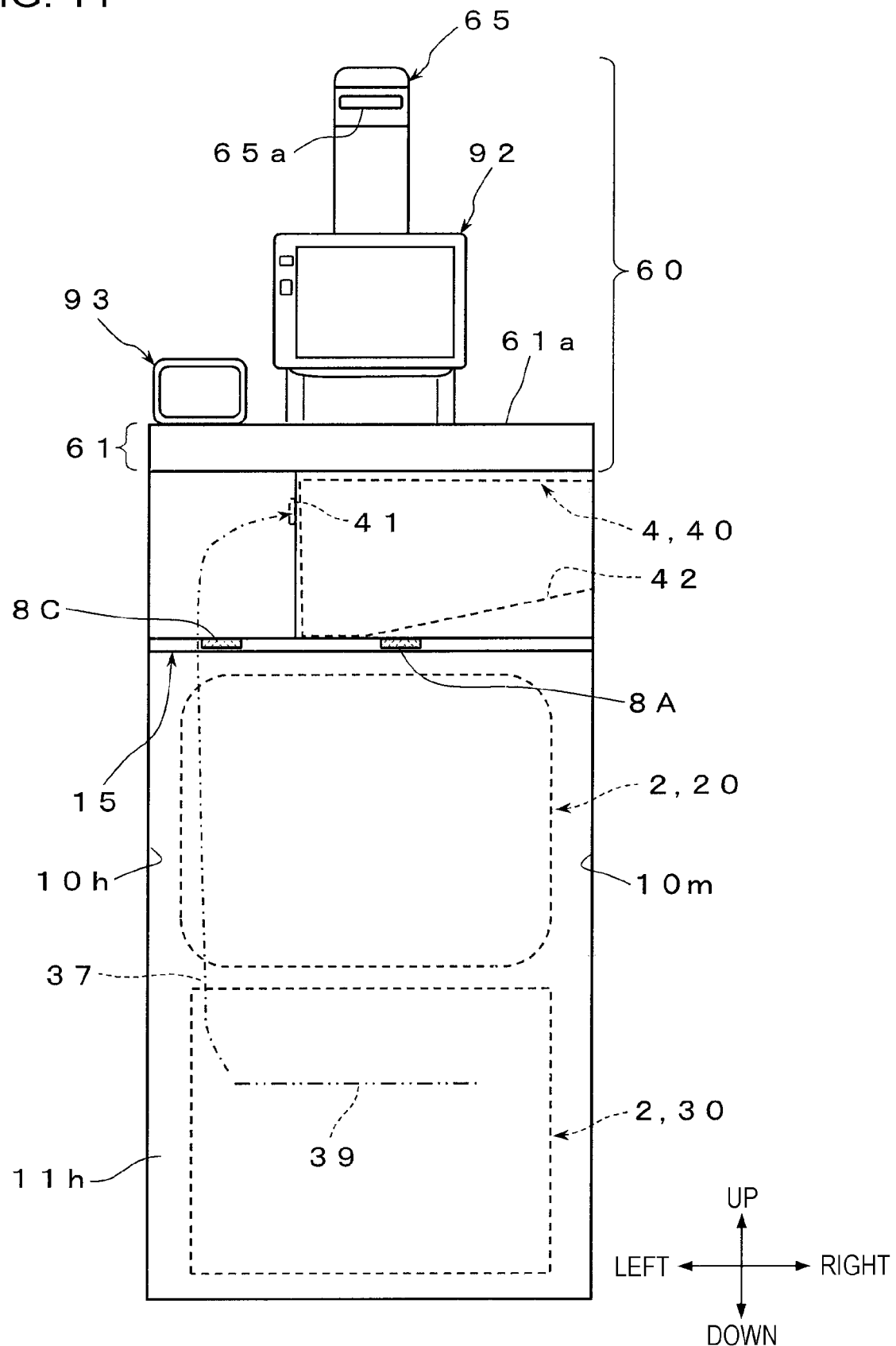
FIG. 14 is a schematic front view of the image forming apparatus of FIG. 13.

FIG. 13 is a perspective view, seen from a diagonally forward position, of an image forming apparatus 1D which is another example of an apparatus having a human detection function according to a fourth exemplary embodiment of the present disclosure. FIG. 14 is a schematic front view of the image forming apparatus 1D. FIG. 15 is a schematic top view of the image forming apparatus 1D.

The image forming apparatus 1D according to the fourth exemplary embodiment is configured in the same manner as the image forming apparatus 1C according to the third exemplary embodiment except for the following points of change.

The points of change are as follows: in addition to the control panel 92 (hereinafter also referred to as a first control panel 92), a second control panel 93 is provided; and in addition to the human detection sensor 7 and the detection window 8 for the first control panel 92 (for detection of a human who approaches the control panel 92), a first human detection sensor 7A and a first detection window 8A for the second control panel 93 (for detection of a human who approaches the second control panel 93) are provided.

Thus, in the following description, common components are similarly labeled with corresponding symbols used in the third exemplary embodiment (including the first exemplary embodiment in a strict sense), and a description thereof is omitted unless it is necessary. Hereinafter the human detection sensor 7 and the detection window 8 are referred to as a second human detection sensor 7C and a second detection window 8C.

The second control panel 93 is disposed at the left front end of the stand 61 of the external reader 60, and formed as a small control panel by which, for example, part of the operation content of the first control panel 92 can be operated.

The second control panel 93 can assume a state of being turned down on the stand 61, for example, when not needed, such as when not in use.

In the image forming apparatus 1D, as illustrated in FIG. 13, FIG. 15, the first control panel 92 and the second control panel 93 are disposed at different positions in the right-left direction of the housing 10C. The first control panel 92 and the second control panel 93 in the fourth exemplary embodiment are disposed at different positions in the front-rear direction and the up-down direction of the housing 10C, too.

More specifically, the first control panel 92 and the second control panel 93 in the fourth exemplary embodiment are disposed so that the position of the second control panel 93 is shifted to the left from the position of the first control panel 92 in the right-left direction. In addition, the second control panel 93 is disposed at a different position shifted to the forward side (the near side) of the first control panel 92 in the front-rear direction. Furthermore, the first control panel 92 is disposed at a different position shifted upward from the second control panel 93 in the up-down direction.

In the image forming apparatus 1D, the housing 10C is provided with a recessed portion 15 having the same configuration (see FIG. 9, FIG. 10) as the configuration of the recessed portion 15 in the third exemplary embodiment.

Furthermore, in the image forming apparatus 1D, as illustrated in FIG. 14, FIG. 15, the first detection window 8A is disposed at a position closer to the first control panel 92 than the second detection window 8C in the right-left direction of the recessed portion 15. In addition, the second detection window 8C is disposed at a position closer to the second control panel 93 than the first detection window 8A in the right-left direction of the recessed portion 15.

Thus, in the image forming apparatus 1D, for example, when a user who approaches the first control panel 92 enters a detection area Ea of the first human detection sensor 7A, the first human detection sensor 7A receives a detection wave which has passed through the first detection window 8A, and detects the presence of the user. In addition, when a user who approaches the second control panel 93 enters a detection area Ec of the second human detection sensor 7C, the second human detection sensor 7C receives a detection wave which has passed through the second detection window 8C, and detects the presence of the user.

In the image forming apparatus 1D, similar to the image forming apparatus 1C according to the third exemplary embodiment, when the detection window 8 is disposed in the recessed portion provided in the exterior part of the housing 10C, the recessed portion 15 gives no incongruous feeling as a design, and makes the detection window 8 less noticeable, as compared with when the recessed portion is at the central position of the exterior part or when the recessed portion is a groove having a length slightly longer than the detection window 8.

In the image forming apparatus 1D, the first detection window 8A and the second detection window 8C are disposed in one recessed portion 15 in the exterior part of the housing 10C.

Thus, in the image forming apparatus 1D, the recessed portion 15 gives no incongruous feeling as a design, and makes two detection windows 8A, 8C less noticeable, as compared with when at least one of the first detection window 8A and the second detection window 8C is not disposed in the recessed portion 15.

Furthermore, in the image forming apparatus 1D, the effects described below are obtained as compared with when the first detection window 8A is not disposed at a position closer to the first control panel 92 than the second control panel 93 in the right-left direction of the recessed portion 15, and the second detection window 8C is not disposed at a position closer to the second control panel 93 than the first control panel 92 in the right-left direction of the recessed portion 15. Specifically, users who respectively approach the first control panel 92 and the second control panel 93 are likely to be individually detected, and the recessed portion 15 gives no incongruous feeling as a design, and makes two detection windows 8A, 8C less noticeable.

Figure 16A:
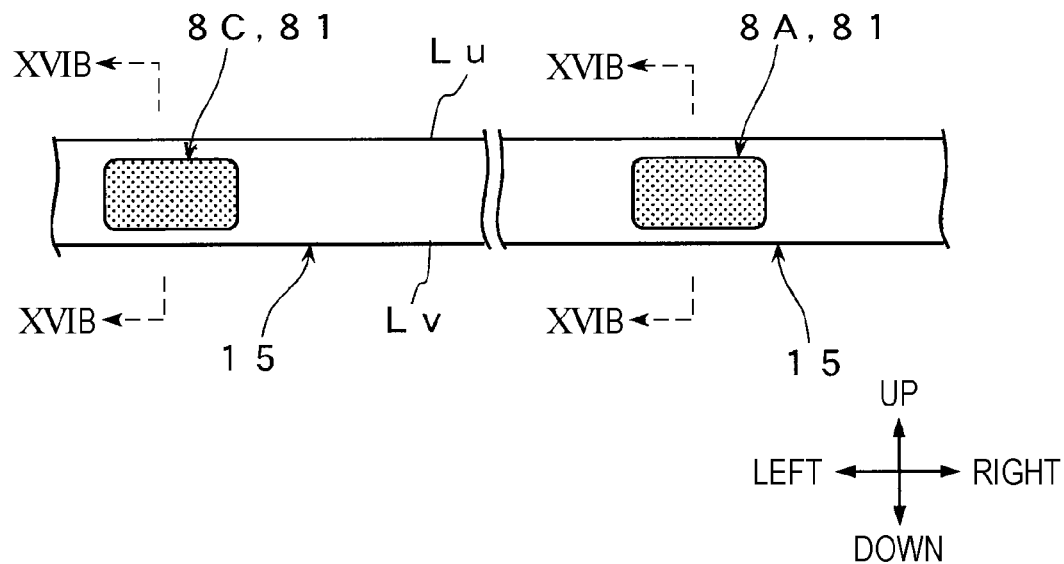
FIG. 16A is an enlarged schematic front view of a configuration of disposition for the recessed portion of the detection window.
Figure 16B:
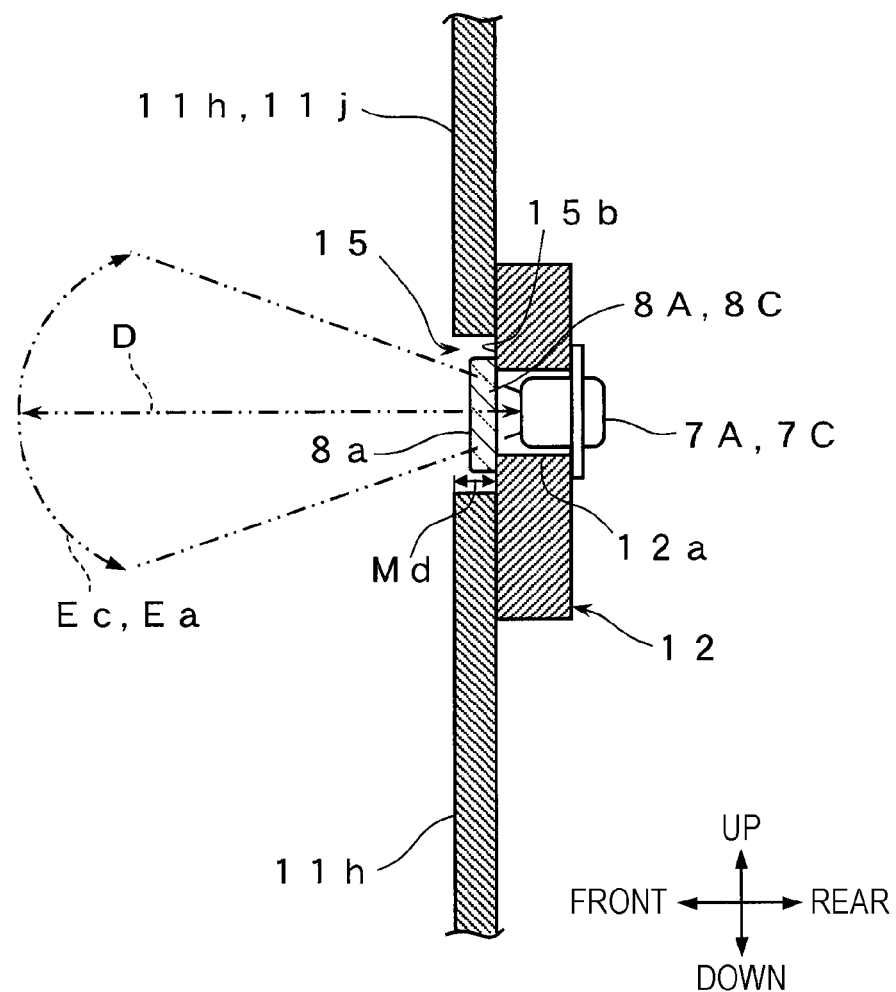
FIG. 16B is a schematic cross-sectional view illustrating both cross-sections taken along line XVIB-XVIB and line XVIB-XVIB of FIG. 16A.

In the image forming apparatus 1D, as illustrated in FIGS. 16A and 16B, the first detection window 8A and the second detection window 8C are disposed at the same position in the width direction (the up-down direction in this example) of the groove that is the recessed portion 15, and at different positions in the right-left direction.

Thus, the recessed portion 15 makes the first detection window 8A and the second detection window 8C less noticeable, as compared with when the first detection window 8A and the second detection window 8C are disposed to have a positional relationship shifted in the up-down direction of the groove that is the recessed portion 15.

Note that the recessed portion 15 illustrated in FIGS. 16A and 16B is a groove having the same depth Md from the surface of the exterior part (the front cover 11h) of the housing 10C. Thus, the first detection window 8A and the second detection window 8C are disposed at the same position in the front-rear direction of the recessed portion 15.

Modifications

The present disclosure is not limited to the content illustrated in the first to fourth exemplary embodiments, and may include, for example, the modifications listed below.

As long as the recessed portion 15 makes the detection window 8 less noticeable, the cross-section of the groove of the recessed portion 15 extending in an elongated manner is not limited to a U shape, and the recessed portion 15 may be a recess having another cross-sectional shape.

The recessed portion 15 formed of an elongated groove is not limited to a groove extending in an elongated manner in the right-left direction, and may be formed as an elongated groove extending in the up-down direction at each of the exterior parts of the housings 10A, 10B, 10C.

Furthermore, the recessed portion 15 formed of an elongated groove may be an elongated groove extending in a diagonal direction to the ends of each exterior part in the right-left direction or the up-down direction. When the recessed portion 15 is formed of an elongated groove which extends in a diagonal direction, the groove width Mw is the dimension along a direction substantially perpendicular to the diagonal direction, and the groove length Mn is the dimension along the diagonal direction.

Each of the detection windows 8, 8A, 8C and the recessed portion 15 is not necessarily provided in the front face on the front face Ft side of each exterior part of the housings 10A, 10B, 10C, and may be provided in the lateral faces on the right and left or the rear face of each exterior part. In addition, two or more detection windows 8 may be disposed in one recessed portion 15. In this case, the number of two or more detection windows 8 is not limited to the number corresponding to the number of control panels installed, and may be a number unrelated to the number of control panels installed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An apparatus having a human detection function, comprising:
    a housing having an exterior part;
    a human detection sensor that detects a human; and
    a detection window which is disposed at a portion of the exterior part, and allows a detection wave used by the human detection sensor to pass through,
    wherein the exterior part has a recessed portion where the detection window is disposed, and
    the recessed portion is a groove which extends to ends of the exterior part, which are provided in a right-left direction, and the groove has dimensions such that a groove length is longer than a groove width.

2. The apparatus having a human detection function according to claim 1,
    wherein the ends of the exterior part provided in the right-left direction are right and left ends provided on an outermost side of the exterior part.

3. The apparatus having a human detection function according to claim 2,
    wherein the groove length has a length longer than or equal to 10 times the groove width.

4. The apparatus having a human detection function according to claim 1,
    wherein one of the ends of the exterior part provided in the right-left direction is an end provided inside the exterior part.

5. The apparatus having a human detection function according to claim 4, wherein the groove length has a length longer than or equal to 10 times the groove width.

6. The apparatus having a human detection function according to claim 1,
wherein the groove length has a length longer than or equal to 10 times the groove width.

7. The apparatus having a human detection function according to claim 1,
wherein the groove has a groove width less than twice a dimension of the detection window in a width direction of the groove.

8. The apparatus having a human detection function according to claim 1,
wherein the detection window is disposed in a state of being inside the groove of the recessed portion.

9. The apparatus having a human detection function according to claim 1,
wherein the detection window is disposed in a state of being in contact with one or both of contours on both sides facing each other in a width direction of the groove.

10. The apparatus having a human detection function according to claim 1,
wherein the detection window is disposed in a state of being inside the exterior part and bridging over one or both of contours on both sides facing each other in a width direction of the groove.

11. The apparatus having a human detection function according to claim 1, further comprising:
an image former that forms an image; and
a document reader that reads a document,
wherein the recessed portion is provided at a portion corresponding to a boundary between the image former and the document reader of the exterior part.

12. The apparatus having a human detection function according to claim 1, further comprising:
an image former that forms an image; and
a stand on which a reading target is placed,
wherein the recessed portion is provided at a portion corresponding to a boundary between the image former and the stand of the exterior part.

13. The apparatus having a human detection function according to claim 1, further comprising:
an image former that forms an image; and
a medium discharger that discharges a recording medium,
wherein the recessed portion is provided at a portion corresponding to a boundary between the image former and the medium discharger of the exterior part.

14. The apparatus having a human detection function according to claim 1,
wherein a plurality of human detection sensors are provided, each of which is the human detection sensor,
a plurality of detection windows are provided, each of which is the detection window and which respectively correspond to the plurality of human detection sensors, and
the plurality of detection windows are disposed in the recessed portion.

15. The apparatus having a human detection function according to claim 14, further comprising:
a first control panel; and
a second control panel,
wherein the plurality of detection windows include a first human detection sensor for the first control panel and a second human detection sensor for the second control panel,
the plurality of detection windows include a first detection window for the first human detection sensor and a second detection window for the second human detection sensor, and
the first detection window and the second detection window are disposed in the recessed portion.

16. The apparatus having a human detection function according to claim 15,
wherein the first control panel and the second control panel are disposed at different positions in the right-left direction of the housing, and
the first detection window is disposed at a position closer to the first control panel than the second control panel in a right-left direction of the recessed portion, and the second detection window is disposed at a position closer to the second control panel than the first control panel in the right-left direction of the recessed portion.

17. The apparatus having a human detection function according to claim 16,
wherein the recessed portion is formed of an elongated groove extending in the right-left direction of the housing, and
the first detection window and the second detection window are disposed at a same position in an up-down direction of the groove of the recessed portion, and at different positions in the right-left direction.

18. An apparatus having a human detection function, comprising:
a housing having an exterior part;
a human detection sensor that detects a human; and
a detection window which is disposed at a portion of the exterior part, and allows a detection wave used by the human detection sensor to pass through,
wherein the exterior part has a recessed portion where the detection window is disposed, and
the recessed portion is a groove having a groove length longer than or equal to five times a dimension of the detection window in a direction along the groove length.

19. The apparatus having a human detection function according to claim 18,
wherein the groove length has a length longer than or equal to 10 times the groove width.

20. The apparatus having a human detection function according to claim 18,
wherein the groove has a groove width less than twice a dimension of the detection window in a width direction of the groove.

* * * * *